United States Patent [19]

Hatch

[11] Patent Number: 4,741,646
[45] Date of Patent: May 3, 1988

[54] MACHINE FOR LAYING CONDUCT AND METHODS FOR USE THEREOF

[76] Inventor: G. Brent Hatch, Box 96, 2661 S. Hwy. 23, Mendon, Utah 84325

[21] Appl. No.: 876,802

[22] Filed: Jun. 20, 1986

Related U.S. Application Data

[63] Continuation-in-part of Ser. No. 729,566, May 2, 1985.

[51] Int. Cl.[4] .......................... F16L 1/02; E02F 5/02; E03F 3/06
[52] U.S. Cl. .................... 405/175; 405/179; 405/181; 37/80 R; 37/DIG. 1
[58] Field of Search ............... 405/154, 174, 175, 181, 405/180, 179, 282, 283; 37/DIG. 1, DIG. 19, DIG. 20, 86, 97, 80 R; 414/747

[56] References Cited

U.S. PATENT DOCUMENTS

| | | |
|---|---|---|
| 259,248 | 6/1882 | Wasson . |
| 332,126 | 12/1885 | White . |
| 1,814,094 | 7/1931 | Rhodes . |
| 2,633,713 | 4/1953 | Shields .................. 405/283 |
| 2,738,745 | 3/1956 | Harpold . |
| 2,830,548 | 4/1958 | McElvany . |
| 3,292,379 | 12/1966 | McElvany . |
| 3,354,661 | 11/1967 | Russell . |
| 3,528,255 | 9/1970 | Blinne .................. 405/180 |
| 3,543,522 | 12/1970 | Torti .................... 405/283 |
| 3,605,419 | 9/1971 | Wells ................... 405/179 |
| 3,608,319 | 9/1971 | Quitadamo ............ 405/283 |
| 3,664,137 | 5/1972 | Lett . |
| 3,778,168 | 12/1973 | Willner ............... 37/80 R X |
| 3,849,998 | 11/1974 | Thacker ............... 405/179 |
| 3,849,999 | 11/1974 | Coffey . |
| 4,002,035 | 1/1977 | Wright . |
| 4,028,902 | 6/1977 | Courson et al. . |
| 4,200,410 | 4/1980 | Baker et al. .......... 405/181 X |
| 4,244,123 | 1/1981 | Lazure et al. ......... 405/181 X |
| 4,273,196 | 6/1981 | Etsusaki et al. ....... 37/DIG. 10 |
| 4,289,424 | 9/1981 | Shefbuch et al. ..... 405/179 |
| 4,310,267 | 1/1982 | Davis . |
| 4,362,435 | 12/1982 | Henry . |
| 4,462,715 | 7/1984 | Ashbaugh . |
| 4,480,942 | 11/1984 | Farrow . |

FOREIGN PATENT DOCUMENTS

| | | |
|---|---|---|
| 1091456 | 8/1916 | Canada . |
| 3306046 | 8/1984 | Fed. Rep. of Germany ...... 405/154 |
| 1464063 | 11/1965 | France .................. 37/DIG. 1 |
| 2506114 | 11/1982 | France .................. 405/175 |
| 653077 | 12/1985 | Switzerland ........... 405/180 |

OTHER PUBLICATIONS

Lewington, "The Drainage Contractor Black Book II," Agri-Book Magazine (1980).
Spectra-Physics, "910 and 942 Laser Level" (1984).
Griswold Machine & Engineering, Inc., "Go With the Rugged Ones: GME" (1978).

Primary Examiner—Cornelius J. Husar
Assistant Examiner—Todd G. Williams
Attorney, Agent, or Firm—Workman, Nydegger & Jensen

[57] ABSTRACT

An apparatus and method for laying conduit within a trench, using a separable boxlike structure with end walls, side walls, a fill bin compartment internal of the boxlike structure for receiving fill material and dispensing fill material onto the bottom of the trench, and a conduit laying compartment through which conduit is fed for positioning on the bottom of the trench. The boxlike structure has a rigidly mounted tow bar which facilitates application of vertical, longitudinal and lateral forces on the boxlike structure to thereby enable an operator of the apparatus to maneuver it on-grade and in alignment along the bottom of the trench. The boxlike structure is maintained on-grade and in alignment with the assistance of a laser transmitter/receiver assembly and several grade-maintenance features, including a shearing blade which automatically adjusts its vertical position in response to the laser. When an obstacle is encountered, the boxlike structure may be separated into an upper portion and lower portion so that the upper portion can be unconnected and removed from the lower portion. The laying of conduit within the trench can continue using only the lower portion until it is clear of the obstacle and the upper portion can be repositioned on the lower portion. The apparatus may also have a dewatering system, a conduit setting system, and a system for dispensing fill material around the conduit and onto the bottom of the trench.

62 Claims, 11 Drawing Sheets

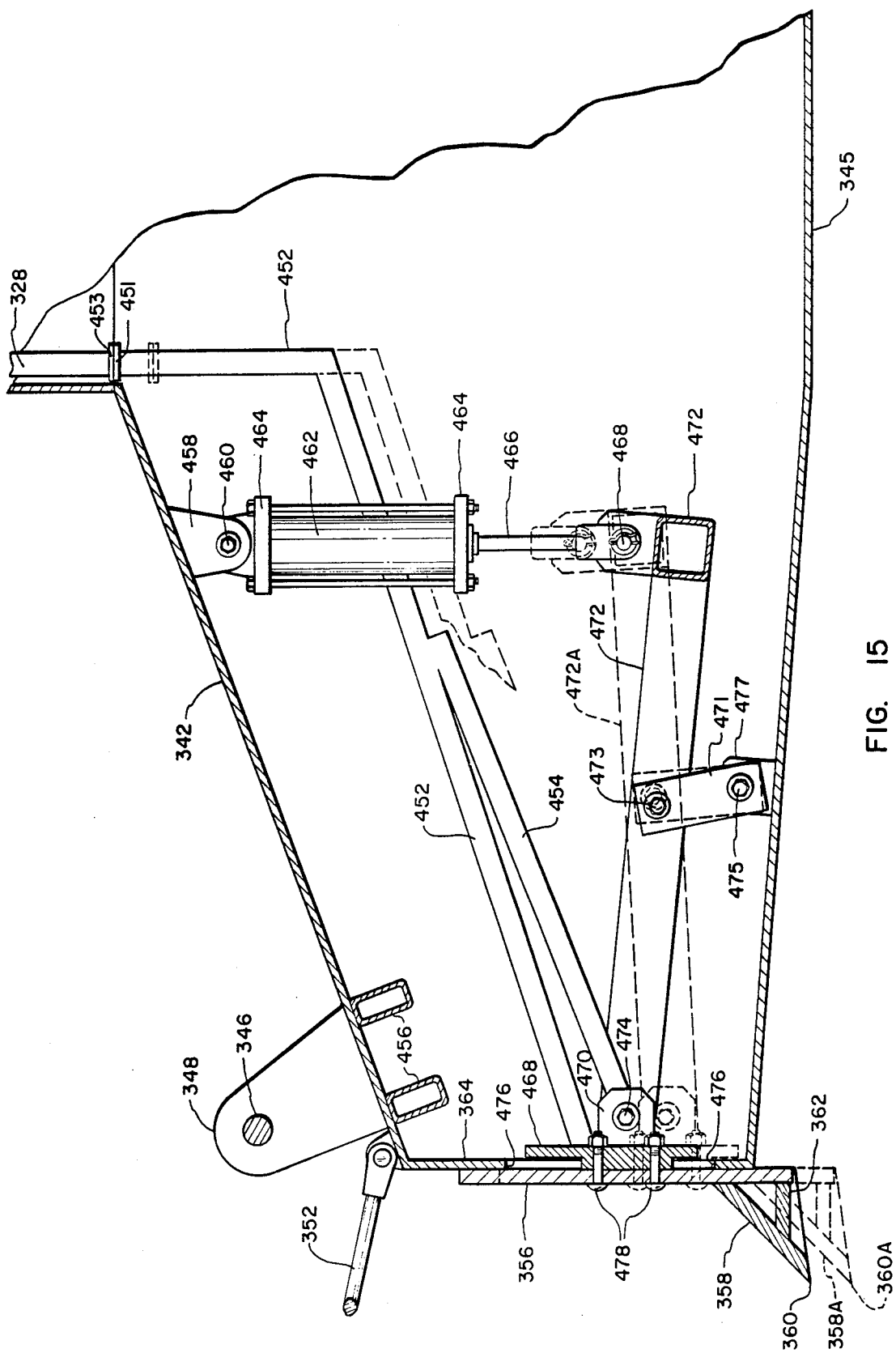

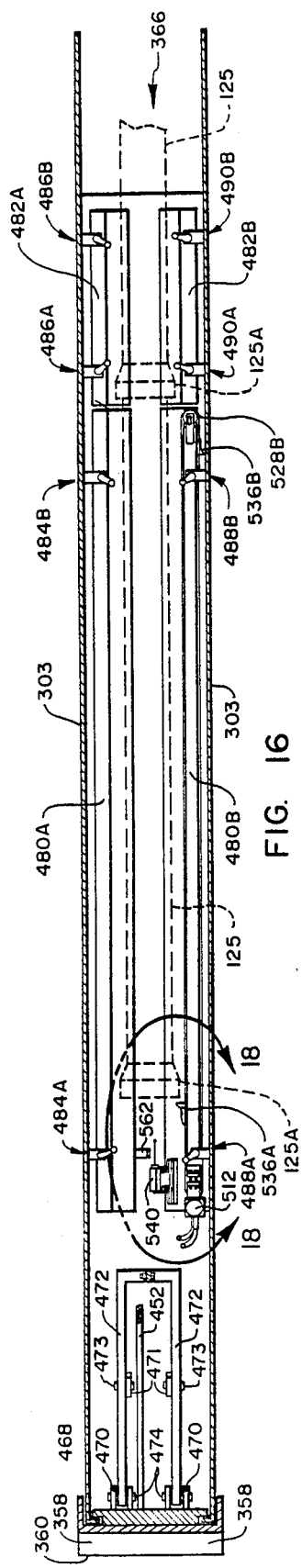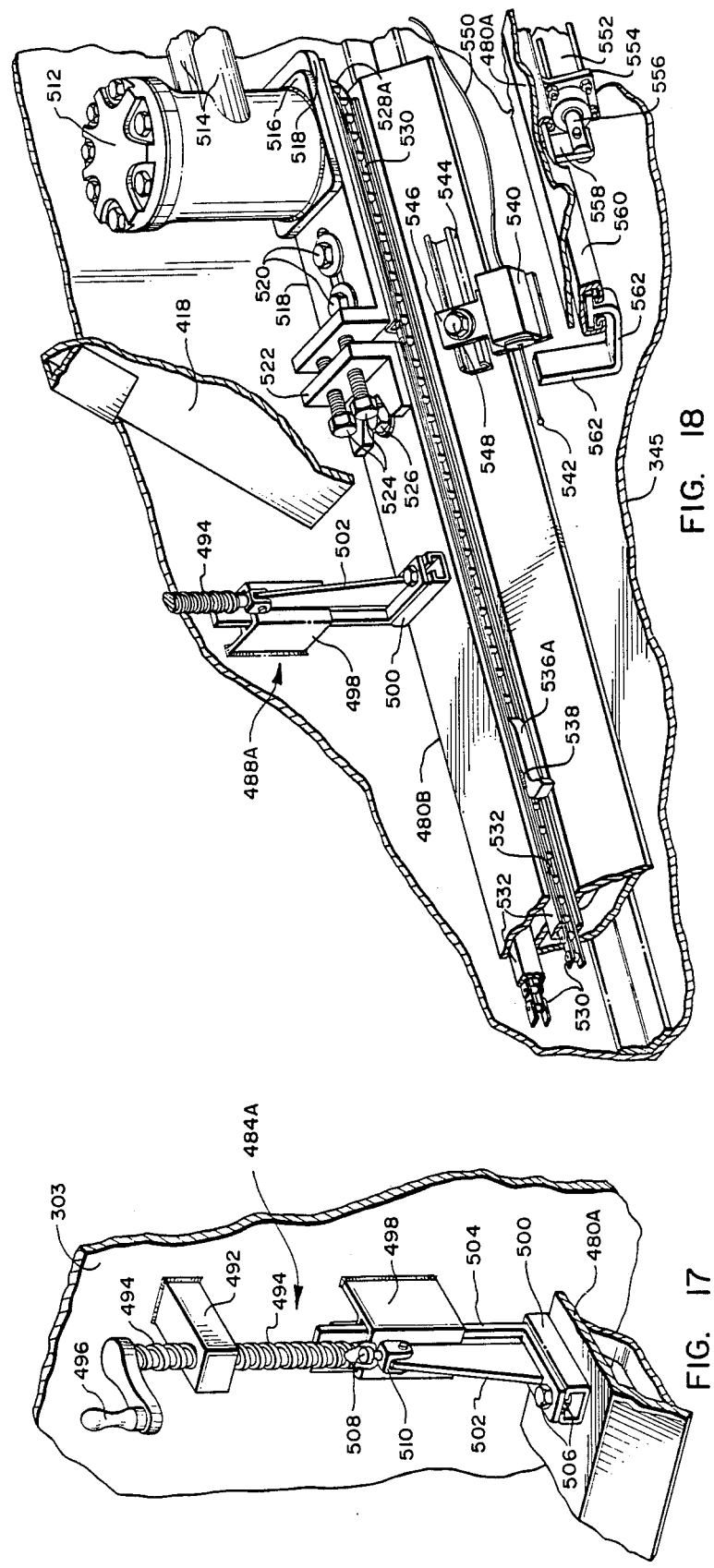

MACHINE FOR LAYING CONDUIT AND METHODS FOR USE THEREOF

This application is a continuation-in-part of U.S. patent application Ser. No. 729,566 filed May 2, 1985 entitled Machine for Laying Conduit and Methods of Use Thereof.

FIELD OF THE INVENTION

The present invention relates to an apparatus used for laying conduit in a trench, and more particularly to a trench boot apparatus and features of the trench boot used in and methods used for laying conduit in alignment and on-grade on the bottom of a trench.

BACKGROUND OF THE INVENTION

Various types of apparatus have been used to lay subterranean conduit. Over the years a number of trenching devices have been developed to meet the needs of underground contractors. When doing subterranean work, various types of ground conditions and obstacles are encountered. The ground to be worked may be stable or unstable, it may contain numerous rocks or other obstacles such as utility lines and other underground conduits, or it may have a high water table. Each different type of ground condition requires that the underground contractor pay particular attention to the safety of the workmen and that procedures designed to achieve the greatest efficiency are followed.

Where the ground is stable and maintains its form when a deep trench is excavated therein, excavation and conduit laying can be done quickly and efficiently without significant danger of the trench walls collapsing. Frequently, in stable ground conditions a conduit laying apparatus such as a trencher with a trench boot is used to cut the trench and lay a uniform layer of fill material in the bottom of the trench upon which the conduit is positioned and aligned. Also, since the trench boots have walls to shore up the walls of the trench, the use of a trench boot provides an added safety precaution which protects the workmen within the trench from collapse of the trench walls.

In unstable ground conditions, the use of conduit laying apparatus such as trench boots or trench boxes becomes more critical. Unstable ground is more prone to collapse into the trench. This creates significant problems to underground contractors. Life and limb of the workmen within the trench can be endangered by collapsing trench walls. Further, it is not infrequent that progress in laying conduit is slow and tedious, because delays are caused by collapsing walls and other problems caused by the unstable ground.

When a trench boot or trench box is not used in unstable ground conditions, the walls of the trench must be sloped back at an angle of repose such that the walls are not likely to collapse into the trench. This means that the excavator must remove considerably more earth from the trench, causing time delays and added expense. For example, if the instability of the ground required that the trench walls be sloped back 45 degrees, for a trench two (2) feet wide and ten (10) feet deep, the excavator must remove 120 cubic feet of earth for each foot of length of the trench. This is an additional 100 cubic feet in excess of the 20 cubic fee for the needed trench. In this instance, excavator time is increased five-fold, and since the use of heavy equipment is quite expensive, the cost of the trenching project is also increased proportionally.

In rocky ground or earth containing obstacles such as utility lines, the underground contractor encounters different and challenging problems. Certain kinds of excavating implements cannot be efficiently used or used without damage either to the implement or the utility line. This severely limits the efficiency of the underground contractor in laying conduit within a trench. In some instances, the use of certain types of excavators and trench boxes becomes cost prohibitive due to the time delays involved in working around obstacles within the trench.

Unique types of problems are presented where the conduit to be laid is in an area where there is a high water table making the ground unstable and difficult to trench. Often, as rapidly as the trench is excavated, it begins to fill with ground water which makes it extremely difficult to lay a fill material bedding or the conduit in the bottom of the trench. In some instances, continuous pumping of the ground water from the trench is futile.

As can be easily seen, the laying of subterranean conduit presents many and varied problems for the underground contractor. Consequently, over the years, there have been a number of implements and apparatus which have been developed to assist the underground contractor in laying conduit within a trench. There have been trench boxes and trench boots utilized with many different types of excavating implements and in a variety of contexts.

For example, there were ditching and tile laying machines which were developed as early as the 1880's in which a plow opened a ditch into which the tile was to be laid. A hopper or chute was attached behind the plow through which tiles were fed and delivered to the bottom of the ditch and a fill material was carried down the chute to cover the positioned tile. However, the plow/hopper apparatus had significant limitations. The ditch created was not very deep because as the plow was placed deeper beneath the ground surface it became more difficult to pull the plow through the earth. Further, many a plow has been broken upon striking a rock hidden below the surface. More importantly, it was extremely difficult to lay tile in a straight line because plows have a tendency to move and deflect along a path of least resistance. Because of the limitations of laying tile using plows to dig the ditch, other types of trenching apparatus were developed.

Later, as trenchers with trenching booms were developed it became easier to dig trenches in alignment by moving a minimum amount of earth. The trenching boom of a trencher is lowered into a trench to the desired depth and digging bucket mechanism adapted for digging an elongated earthen trench is used to cut the trench in which the conduit is to be laid. The efficiency of the underground contractor was improved tremendously by the advent of trenchers, particularly where the trench was to be excavated under stable ground conditions. The trencher could remove only the earth necessary to open the appropriate size of trench.

However, under unstable ground conditions, the walls of the trench frequently would slough into the trench behind the trencher boom before conduit could be laid. To minimize this problem trench boots were developed. The trench boots were typically boxlike apparatus attached behind the trencher boom. The development of trenchers with trench boot mobile housings which followed behind the digging bucket mechanism of the trencher boom within the trench became an integral part of efficiently laying conduit within a trench. Illustrative examples of the type of trench boots developed to be used in conjunction with trenchers are U.S. Pat. No. 3,605,419, issued to M. E. Wells, Sept. 20, 1971, entitled "Method and Apparatus for Laying Pipe," and U.S. Pat. No. 4,028,902, issued to Courson et al., June 14, 1977, entitled "Apparatus for Laying Elongated Flexible Tubing." However, most trench boots used with trenchers are designed to lay only flexible pipe.

Despite the usual efficiency of trench boots used with trenchers, there are certain types of ground conditions and obstacles encountered which make the use of a trencher unfeasible. For example, it is not advisable to use a trencher to excavate a trench in areas where there are numerous utility lines. Each time a utility line is encountered, the trenching boom with the trench boot attached thereto must be removed from the trench and the earth surrounding the utility line must be cleared away, either manually or using some other type of excavating implement such as a backhoe. Thus, additional heavy equipment must be continuously on call to relieve the trencher when a utility obstacle is encountered. This significantly increases the cost of the project and decreases the efficiency of the underground contractor.

More importantly, it is not unusual in such instances that the operator of the trencher will sever utility lines within the trench. This interjects tremendous delays and can be extremely dangerous. The utility lines must be repaired before the conduit-laying project can continue. The utility company must be notified and the subterranean work ceases until a utility company crew can repair the problem. Further, if the utility line severed is a gas line, there is a serious chance of an explosion and the work area as well as the surrounding area may have to be evacuated until the problem is remedied.

Independent of those types of problems, since the trench boot must be removed from the trench, the pipe must be laid manually at the bottom of the trench without the safety of the trench boot walls. Consequently, in the vicinity of the utility line it is not uncommon that the walls of the trench must be sloped back at an angle of repose sufficient to assure that the walls of the trench will not collapse on the workers as they are manually laying the conduit. This can involve moving tremendous amounts of earth causing additional delays. Once the conduit is laid beneath the utility obstacle the trencher with the trench boot attached can be lowered into the trench and excavation can recommence. However, if another obstacle is encountered, the same tedious and time consuming process must be undertaken. For these and other significant reasons, use of a trencher with a trench boot attached thereto frequently is not the most cost effective way to lay conduit.

Trench boxes have been designed to assist in laying conduit in areas where it is not advisable to use a trencher. Trench boxes usually comprise spaced walls supported by transverse rods which hold the walls in a spaced relationship. When a deep trench is required, the trench boxes are merely stacked one on top of the other until the desired height is reached. The walls of the trench box provide the abutment against which the walls of the trench would fall in the event of a collapse. In this manner workers within the trench box are protected from trench wall collapse.

Under stable ground conditions, it is not unusual that the excavating machine (e.g., a backhoe) can excavate a trench in advance of the trench box. The trench carved out of the earth is necessarily wider than the trench box and once the conduit is laid on the bottom of the trench within the trench box, the trench box may be advanced for continuing the conduit-laying procedure.

Under unstable ground conditions, the use of a trench box becomes much more complex. Excavation of the trench in advance of the trench box is not feasible because the walls of the trench tend to collapse before the trench box can be advanced. As a result, conditions may require that a different method be used. One common method that has been used involves placing the trench box on the surface of the ground where the trench is to be excavated. Earth is excavated from within the trench box and the trench box is tapped down into place gradually as the earth within the trench box is removed. This procedure is continued until the trench box is located at the desired depth. The conduit can then be laid within the trench box on the bottom of the trench. To advance the trench box, the underground contractor cannot remove the trench box from the trench because the unstable walls of the trench may collapse about the freshly laid conduit before the connecting conduit can be laid. Therefore, to lay additional conduit the trench box is pulled forward and its forward end tilted at an angle because it rests on unexcavated earth. Then, more earth is excavated from within the trench box. The forward end of the trench box is tapped down until it reaches the desired depth and levels off with the rear of the trench box. Additional conduit can be laid once the trench box reaches the desired depth. This procedure is performed repeatedly until the desired distance of conduit is achieved.

If a utility line is encountered the trench box usually must be removed from the trench and the area around the utility must be cleared so that conduit can be laid manually in the vicinity of the utility obstacle.

Further, with most trench box apparatus there is no facility for automatically laying a fill material bedding on-grade upon which the conduit can be laid. Usually, the fill material must be leveled manually before the conduit can be positioned. Consequently, although in some instances it may be more cost effective to use a trench box to lay conduit under certain ground conditions, it is still an extremely time consuming, difficult and expensive procedure.

Additional problems are created when ground water rapidly fills the trench. With most trench boxes, there is no facility to handle such seepage and pumps are frequently used to extract as much of the ground water as possible. Where the water table is extremely high, the use of a trench box may not be as effective because the ground water moves the soil in too rapidly to allow the laying of the conduit.

One device which has been developed to extract ground water from a trench is illustrated in U.S. Pat. No. 4,462,715, issued to Ashbaugh, July 31, 1984, entitled "System for the One-Step Dewatering of a Trench and the Construction of a Pipeline Bed." The device used is a stone-filled box which is pushed along the trench in increments as the trench is excavated ahead of the box. Simultaneously, the box dispenses stone out the rear end of the box to form a bed which shores up the side of the trench and upon which conduit can be laid.

A pump is provided inside the stone-filled box to extract water which has seeped into the box. With this device, however, the conduit is laid on the bed of stone discharged from the stone-filled box. Consequently, if the trench is quite deep or if the water table is quite high the sides of the trench may collapse or water may seep into the trench and the bedding layer before conduit can be laid.

Despite the development of various types of devices, trench boots used in conjunction with trenchers, trench boxes, trench hoppers or chutes following plows and other types of devices, there are some problems that heretofore have remained unsolved. For example, it is extremely difficult to maintain grade and alignment of conduit being laid in a deep trench. In the past, grade and alignment have been matters of estimation and approximation by the underground contractor or the worker operating the trenching devices. As more sophisticated technology became available, it became possible to use lasers in the bottom of a trench to assist in alignment and maintaining grade. However, intrench laser systems cannot always be used to accurately align a conduit or maintain it on-grade, particularly where severe conditions exist because water and/or sand move into the conduit and deflect or obstruct the laser beam.

Also, the normal procedure for conduit laying, as outlined in the "Caterpillar Equipment Performance Guide Book" is for an excavator to dig a portion of the trench and then to sit idle while the conduit is set. Once the conduit is set, the excavator commences digging on the next portion of the trench. With this procedure, the excavator is actually digging only about half the time.

The handling of the conduit itself has also presented problems. Where the conduit is heavy cement sewage pipe, it is difficult for one worker to lower the pipe into the trench, or to position the pipe, particularly when the trench is rather deep. When the pipe is flexible pipe it is critical that the pipe be delivered to the bottom of the trench in a manner which will not kink or damage the pipe. Since different types of pipe or conduit present different types of problems, heretofore there has not been a trench boot or trench box which readily enables the underground contractor to simultaneously lay two types of conduit, namely flexible and rigid conduits.

Thus, although there have been a number of developments in trench boots and boxes which assist in the laying of conduit within a trench, it would be an improvement to provide an apparatus in which laying subterranean conduit under a variety of ground condition would be efficient and economically justifiable. It would be an improvement to provide a structure which could be separated quickly and easily to avoid obstacles such as utility lines within a trench while still permitting conduit to be laid with the assistance of that structure in the vicinity of and beneath the utility line. It would be a further improvement to provide an operations-efficient apparatus which can be operated to significantly reduce the amount of earth that must be excavated from and back filled into a trench, and which requires a minimum of large excavating equipment, and permits such excavating equipment to be engaged in the trench-digging function almost continuously. It would be another improvement to provide an apparatus which would have dewatering capability to assist in the laying of conduit in areas with high water tables. It would be still another improvement to provide a conduit lowering system which would automatically deliver and align conduit within the trench. It would be a further improvement to provide a grade and alignment system, heretofore not provided with trench boxes, which would increase the operator's ability to maintain the apparatus on-grade and in alignment. It would be another improvement to provide an apparatus which would permit more than one type of conduit to be laid in alignment and ongrade simultaneously. It would be still another improvement to provide an apparatus which dispenses the exact amount of fill material desired into the trench at the proper time and place, thereby eliminating waste of labor, material and equipment time.

OBJECTS AND BRIEF SUMMARY OF THE INVENTION

In view of the foregoing needs and problems experienced by underground contractors and workmen in laying conduit within a trench which make trench boots and trench boxes desirable, it is a primary object of the present invention to provide an improved trench boot apparatus that can be separated quickly and easily to avoid utility lines in a trench while still providing apparatus to assist in the laying of conduit in the trench.

It is another object of the present invention to provide an apparatus for the laying of conduit within a trench in which a grade and alignment system is provided to assure that the conduit is laid in alignment and on-grade.

A further object of the present invention is to provide an apparatus for laying conduit within a trench in which a dewatering system is provided for extracting ground water which seeps into the apparatus.

Yet another object of the present invention is to provide an apparatus for laying conduit within a trench in which a mechanism is provided to assist in the lowering of conduit into the trench for positioning in alignment and ongrade.

Still another object of the present invention is to provide an apparatus for laying conduit within a trench which enables the underground contractor to simultaneously lay different types of conduit.

A further object of the present invention is to provide a sturdy apparatus for the laying of conduit within a trench and for shoring up the walls of the trench thereby providing safety to the workers within the trench and preventing damage to the conduit caused by collapsing trench walls.

Another object of the present invention is to provide an apparatus which can be separated into easily stackable components thereby facilitating easy transport of the apparatus from one job site to another.

The foregoing objects are accomplished by the apparatus of the present invention which is used for laying conduit within a trench and which comprises a boxlike structure having side walls and end walls. The boxlike structure has internal compartments and is separable into an upper portion and a lower portion. In one embodiment the compartments comprise at least a fill bin compartment for receiving fill material and dispensing the fill material on the bottom of the trench, and a conduit laying compartment partially open at its top and bottom through which conduit is lowered and positioned.

One embodiment of the apparatus of the present invention is advanced through the trench by use of a tow bar rigidly mounted to the forward end wall of the boxlike structure. In another embodiment a wire rope loop is also similarly mounted. The tow bar is spaced from the forward end wall by mounting brackets thereby enabling the bucket of a backhoe or other excavator to grasp the tow bar and maneuver the boxlike structure by applying pulling, upward or downward force upon the tow bar and/or forward wall of the boxlike structure. Similarly, the wire rope loop allows somewhat the same movement control. This configuration for the tow bar allows the excavator to quickly attach itself to and maintain positive control of the boxlike structure, and to release quickly so as to recommence excavation. In this manner, the boxlike structure of one embodiment can be lifted or lowered while advancing the boxlike structure to make adjustments necessary to maintain it on-grade.

An assembly by which the upper portion of the boxlike structure is secured in nesting engagement to the lower portion of the boxlike structure is provided so that the upper portion rests perfectly aligned and flush with the lower portion. The assembly comprises a series of transverse rods extending below the lower edge of the upper portion of the boxlike structure. The transverse rods are connected to the upper portion by U-shaped brackets which nest in, and register with, U-shaped cups mounted within the lower portion of the boxlike structure. Latches are provided to secure the lower portion to the upper portion.

In one preferred embodiment of the present invention, the boxlike structure has an angled nose which extends forward inclining downwardly to a cutting edge and is located on the lower portion of the boxlike structure. This angled nose assists in shearing the bottom of the trench on-grade, and provides an incline upon which the two bar can be conveniently mounted for easy access by an excavating implement. The freshly sheared bottom of the trench is ready to receive fill material at whatever uniform thickness is desired. Thus, there is no need to overexcavate the trench to assure a proper bed of fill material.

In another preferred embodiment of the present invention, the boxlike structure has a nose section which extends forward but does not incline to a cutting edge. Rather, a shearing blade is adjustably mounted to the nose section such that the shearing blade may be adjusted upward or downward. Thus, as the boxlike structure is pulled forward, the shearing blade may be adjusted upward or downward such that the freshly sheared bottom of the trench is maintained on-grade. Furthermore, the upward or downward adjustment of the shearing blade may be automatically accomplished by a hydraulic actuated level system controlled by a laser level detection system, to be discussed hereinafter.

With another preferred embodiment of the present invention, the boxlike structure has an enclosed compartment with a floor which extends from the nose to the point at which fill material is discharged from the fill bin compartment into the trench. This enclosed compartment provides a water collection area to assist a dewatering system in removing ground water which seeps into the boxlike structure. Vent openings in the enclosed compartment permit ground water to flow into the enclosed compartment where a pump or suction screen can be used to extract the ground water which accumulates within the enclosed compartment. Also, the enclosed compartment may comprise a feed tunnel whereby flexible conduit can be fed into the feed tunnel for discharge into the layer of fill material near the floor of the enclosed compartment. Thus, flexible conduit can be fed through the enclosed compartment to disposition at the bottom of the trench within an envelope of fill material while other conduit is being simultaneously laid on top of the fill material bed.

Several additional features can be provided for the apparatus of the present invention which assist in the laying of conduit in alignment and on-grade. The apparatus may further comprise a leveler gate which strikes off the fill material at a predetermined trench depth. It is preferred that this leveler gate be automatically operated to adjust its position to compensate for movement off-grade. Movement off-grade is detected by use of a laser transmitter disposed outside the trench which provides a beam received by a laser receiver mounted on the apparatus of the present invention. The laser receiver determines if the apparatus is off-grade, and if so, it actuates a mechanism which causes the leveler gate to raise or lower accordingly.

In still another preferred embodiment, the laser transmitter also provides an alignment beam which strikes a target mounted on the apparatus. The operator of the apparatus watches the target for a visual display of whether the apparatus is in alignment and on-grade. To make adjustments, the operator causes the bucket of the excavating implement to apply upward, downward or lateral force at the tow bar to compensate for any misalignment or to correct for the distance off-grade.

In the embodiment incorporating an automatically adjusted shearing blade the laser transmitter and receiver system provides a control signal proportional to the distance that the boxlike structure is off-grade. The control signal is translated into movement of the adjustable shearing blade, either up or down, in order to keep the structure on-grade. The translation of the control signal is accomplished by a hydraulic ram and lever arrangement.

Another feature that can be provided is a fill material notcher which provides a notch in the surface of the fill material bed being laid on the bottom of a trench to accommodate the bell end of a conduit having a bell. A notching gate is provided which carves into the fill material to create a notch. It is preferred that the notching gate be mounted on the leveler gate and that it be automatically operated to place the notch in the proper position. To accomplish this a roller arm is provided which travels the top surface contour of a previously laid conduit section. When the roller arm encounters the bell of the previously laid conduit a signal actuates the notching gate to extend it below the leveler gate thereby carving a notch in the fill material. The notch in the fill material is thus positioned to accommodate the bell of the next conduit to be positioned at the bottom of the trench.

A further feature of the present invention that can be incorporated into one of the preferred embodiments to accommodate conduit or pipe having a bell is a two level conduit support rail system. In the two level pipe support rail system two individual lengths of pipe or conduit are supported from off the floor of the boxlike structure. The first length of pipe is supported by pipe support rails at a lower level than the level at which the second length of pipe is supported. This difference in level allows the bell of the first length of pipe to properly align with the second length of pipe as both are laid in the bottom of the trench.

Still another feature of the present invention incorporated into one of the preferred embodiments is a conduit lowering assembly which lowers the conduit into the boxlike structure in a manner such that it is aligned and readied for setting with previously laid conduit. The lowering assembly comprises a grasping mechanism which grasps a conduit section to be lowered into the apparatus. The grasping mechanism comprises a guide tube within which a sliding member is disposed. A clamp which grasps the barrel portion of the conduit is connected to the guide tube. The sliding member has a hook end which supports the bell portion of the conduit. Once the grasping mechanism is lowered into the boxlike structure, it can be advanced rearward into setting engagement with the previously laid conduit either manually or by a push arm which engages and pushes the bell portion of the conduit. As the conduit is being pushed forward the sliding member slides within the guide tube, the clamp is released, and the hook is released from its supporting engagement such that the grasping mechanism can be removed from the conduit without disturbing the positioning of the conduit.

The grasping mechanism is lowered into the boxlike structure of the apparatus by a lowering mechanism comprising vertical rails in which a support structure moves vertically upward and downward. The support structure has support arms upon which the grasping mechanism is placed. By placing the grasping mechanism in notches provided in the support arms, the conduit is centered and aligned with the previously laid conduit.

The apparatus of the present invention provides the underground contractor with tremendous versatility. The apparatus can be used in stable or unstable earth and can significantly reduce the time it takes to lay conduit in rocky ground, ground with a high water table, or ground containing utility lines. Under stable ground conditions, the apparatus provides shoring walls to protect workers from collapse of the trench walls and a self-dispensing system for the rapid delivery of a fill material to the bottom of the trench. Under unstable ground conditions, the operator of the apparatus need only clear away sufficient earth to enable the operator to pull the apparatus forward. The angled nose cutting edge or the adjustable shearing edge assist in shearing the trench to its proper depth. With regard to ground conditions having a high water table, the walls of the boxlike structure prevent ground water from seeping laterally into the conduit laying area. Further, the floor provides a barrier to the ground water which enables the operator to lay a uniform layer of fill material on the bottom of the trench before there is an opportunity for water seepage. Also, much of the water that may eventually seep into the boxlike structure passes through vent openings into the enclosed compartment from where it can be collected and pumped from the bottom of the trench.

For conduit being laid in areas having utility lines, the apparatus of the present invention is particularly useful. The excavator clears the earth from around the utility line. A fill material shut-off gate is closed to prevent spillage of fill material from the upper portion of the boxlike structure. Then the latches securing the upper portion of the boxlike structure to the lower portion are released so that the upper portion may be lifted from the lower portion and removed from the trench. The lower portion then can be pulled beneath the utility line. This lower portion provides shoring walls and a work area to facilitate the laying of conduit on the bottom of the trench beneath the utility line. After the utility line has been cleared, the upper portion of the boxlike structure may be repositioned squarely on top of the lower portion and secured thereto for further installation of conduit.

BRIEF DESCRIPTION OF THE DRAWINGS

For a more complete understanding of this invention, reference should now be made to the embodiments illustrated in greater detail in the accompanying drawings and described below. In the drawings:

FIG. 15 is a top view showing in greater detail the conduit support system of the embodiment shown in FIG. 13;

FIG. 16 is a perspective view showing the mechanism used to adjust the level of the conduit support system shown in FIG. 15;

FIG. 17 is a perspective view showing another portion of the pipe support system shown in FIG. 15; and FIG. 18 is a perspective view showing in detail the pipe setting mechanism of the embodiment illustrated in FIG. 16.

DETAILED DESCRIPTION OF THE PREFERRED EMBODIMENTS

Figure 12:
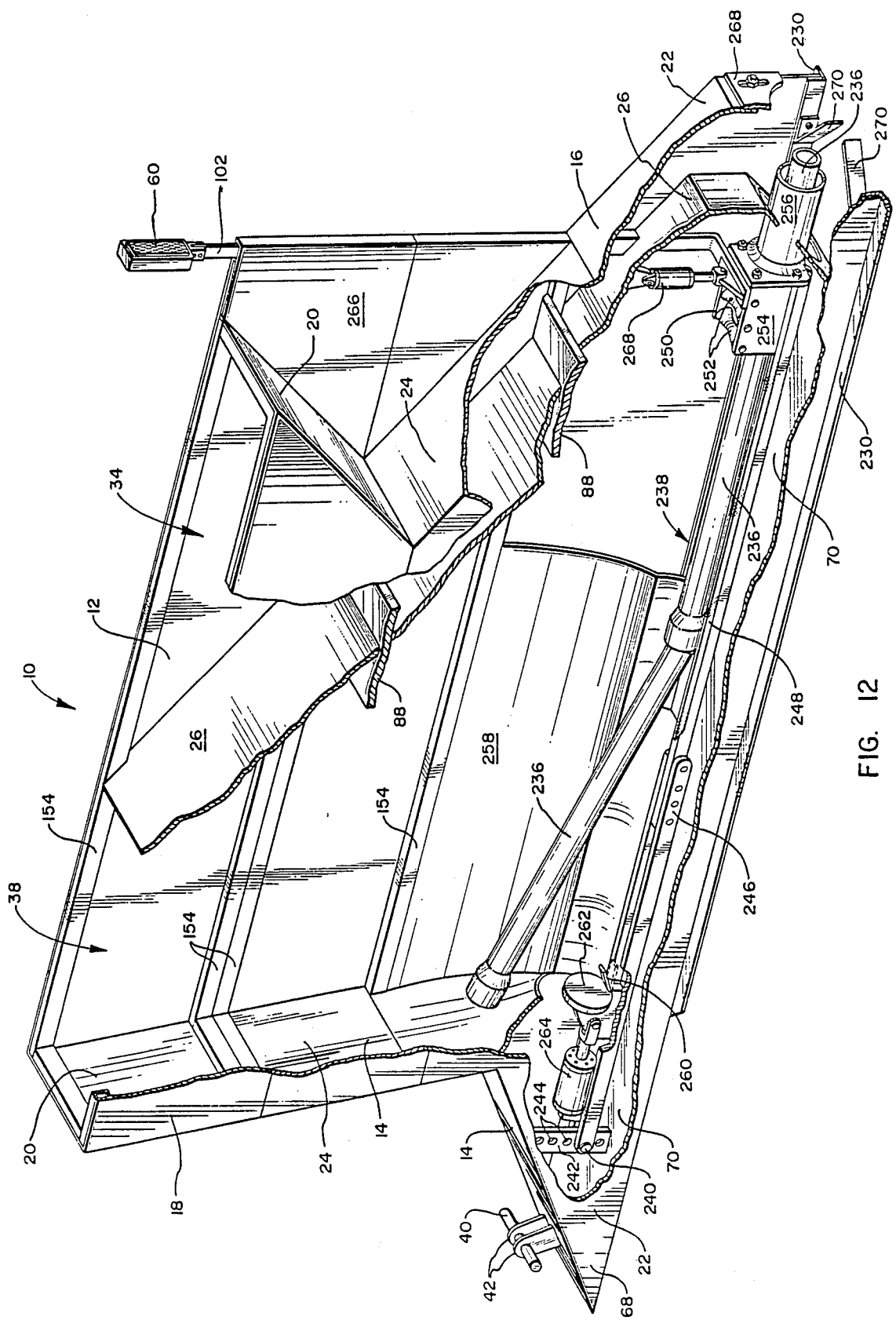
FIG. 12 is a perspective view of an alternative embodiment of the present invention with a side and end wall partially cut away to illustrate the internal components thereof.

Referring now specifically to the drawings, wherein like numerals indicate like parts throughout, the apparatus for laying conduit within a trench in generally designated 10 and comprises a boxlike structure 12 having forward and rear end walls 14 and 16 and side walls 18. The boxlike structure 12 is configured to separate into an upper portion 20 and a lower portion 22. Of course, it should be understood that the boxlike structure 12 may separate into more than two portions, such as illustrated in FIG. 12 wherein an intermediate portion 24 is illustrated.

Figure 2:
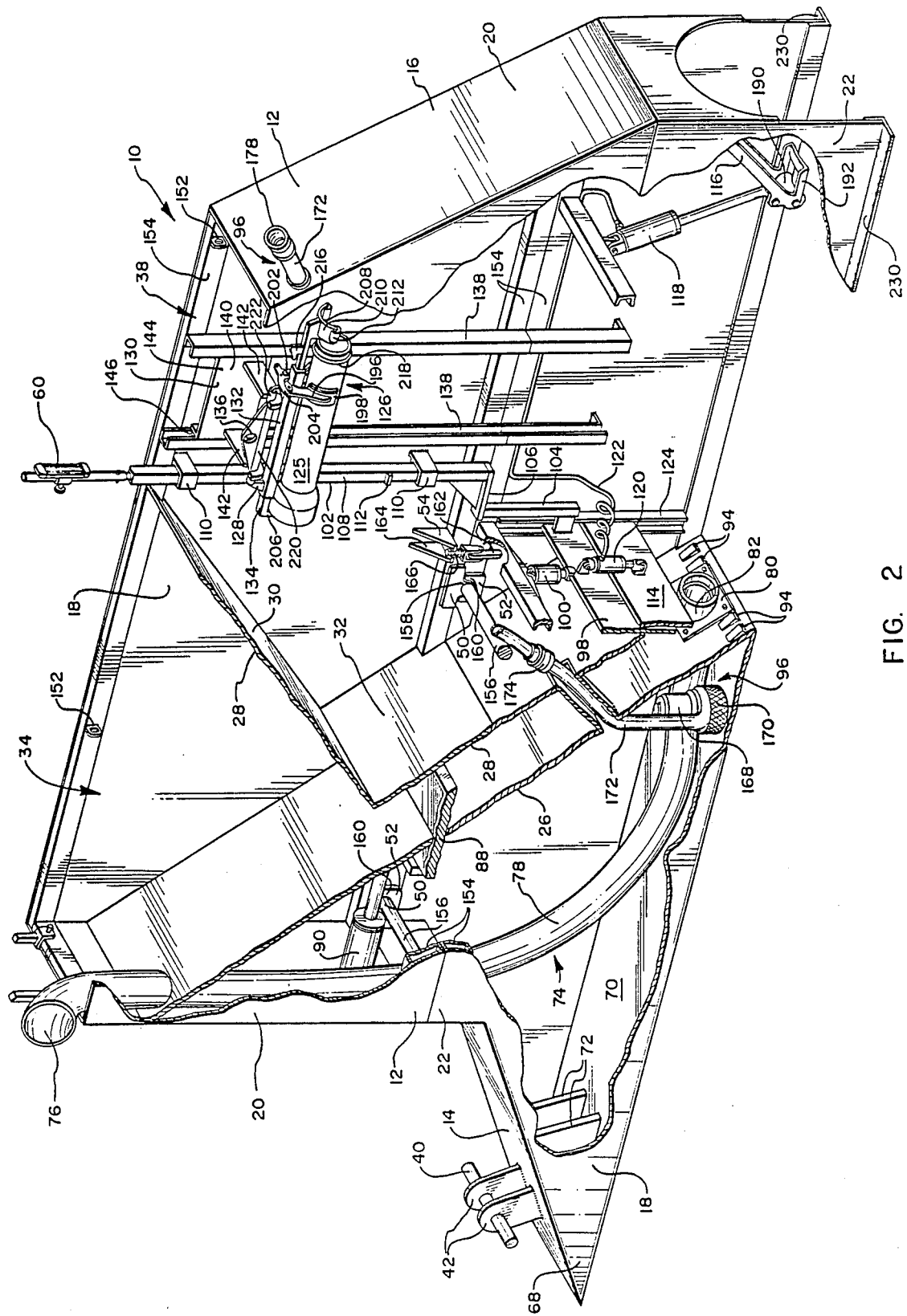
FIG. 2 is a perspective view of the apparatus with a portion of the side wall cut away so that the various features internal of the apparatus can be shown in their relative disposition to each other.
Figure 3:
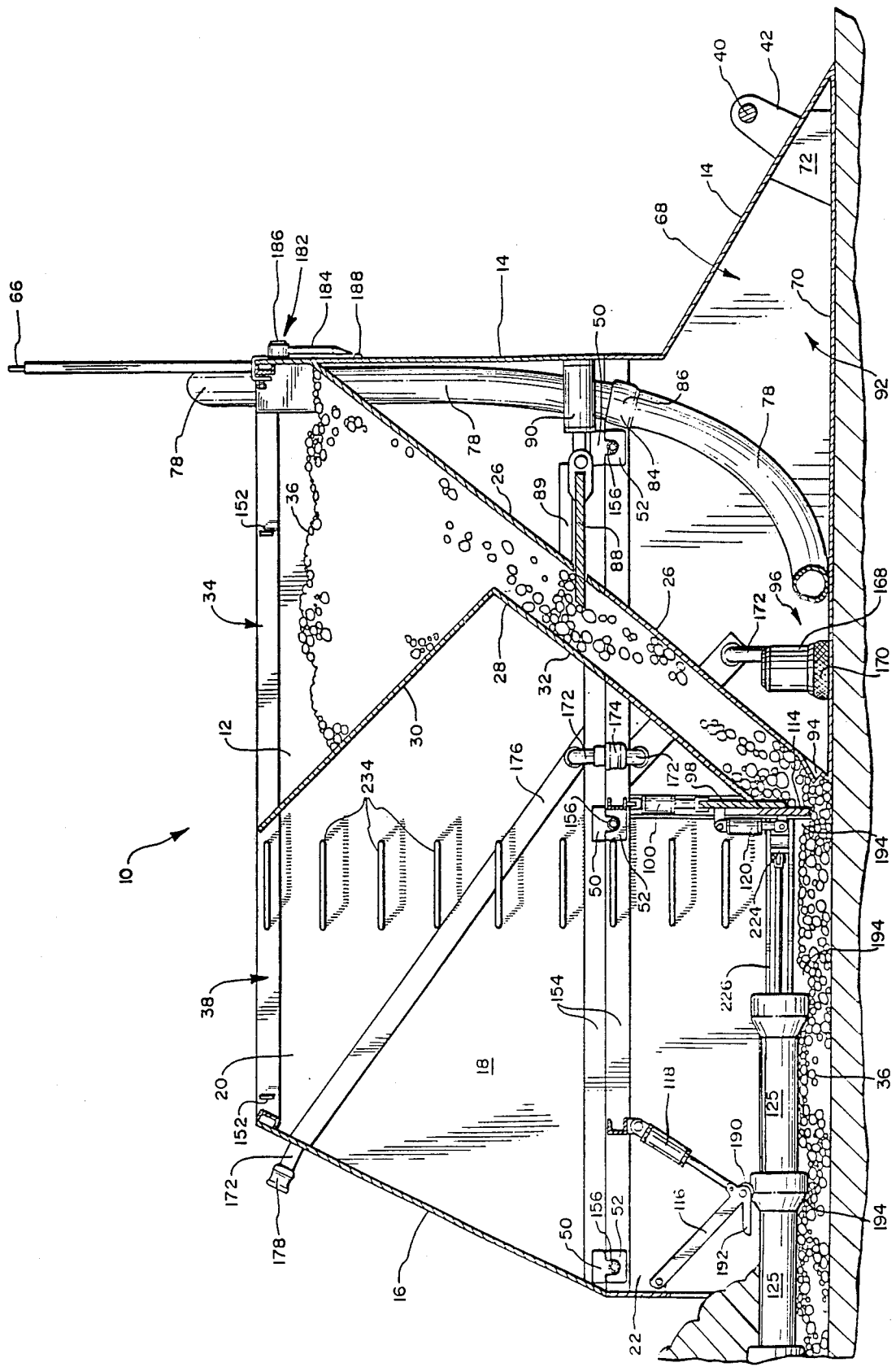
FIG. 3 is an elevational, longitudinal section view of the apparatus showing the relative disposition of various features within the one embodiment of the present invention.
Figure 7:
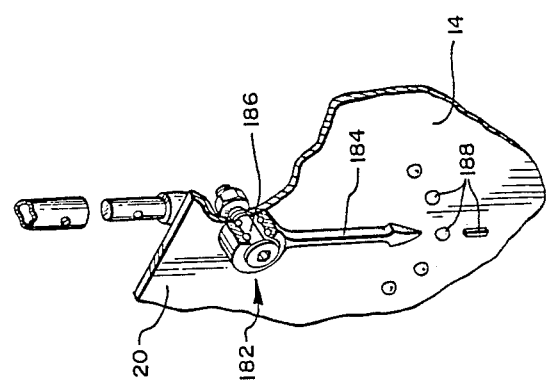
FIG. 7 is an enlarged cut-away view of a tilt indicator mounted on the forward end wall of the apparatus of the present invention.

As shown particularly in FIGS. 2 and 3, the boxlike structure 12 further comprises internal transverse walls which define compartments within the boxlike structure 12. The boxlike structure 12 has a fill bin compartment 34 internal of the boxlike structure 12 for receiving fill material 36 and dispensing the fill material 36 on the bottom of a trench and a conduit laying compartment 38 which is the area in which conduit is fed for alignment and positioning at the bottom of a trench. In one of the preferred embodiments of the present invention, as illustrated in FIG. 2, the fill bin compartment 34 is defined by an interior fill material side wall 26 and an interior fill material bin wall 28. The interior fill material bin wall has a hopper portion 30 and a chute portion 32. In another preferred embodiment of the present invention illustrated at FIG. 12, the boxlike structure 12 has only one interior transverse wall, the interior fill material slide wall 26 and the rear end wall 16 serves as the hopper portion and chute portion for a fill material bin wall.

Figure 1:
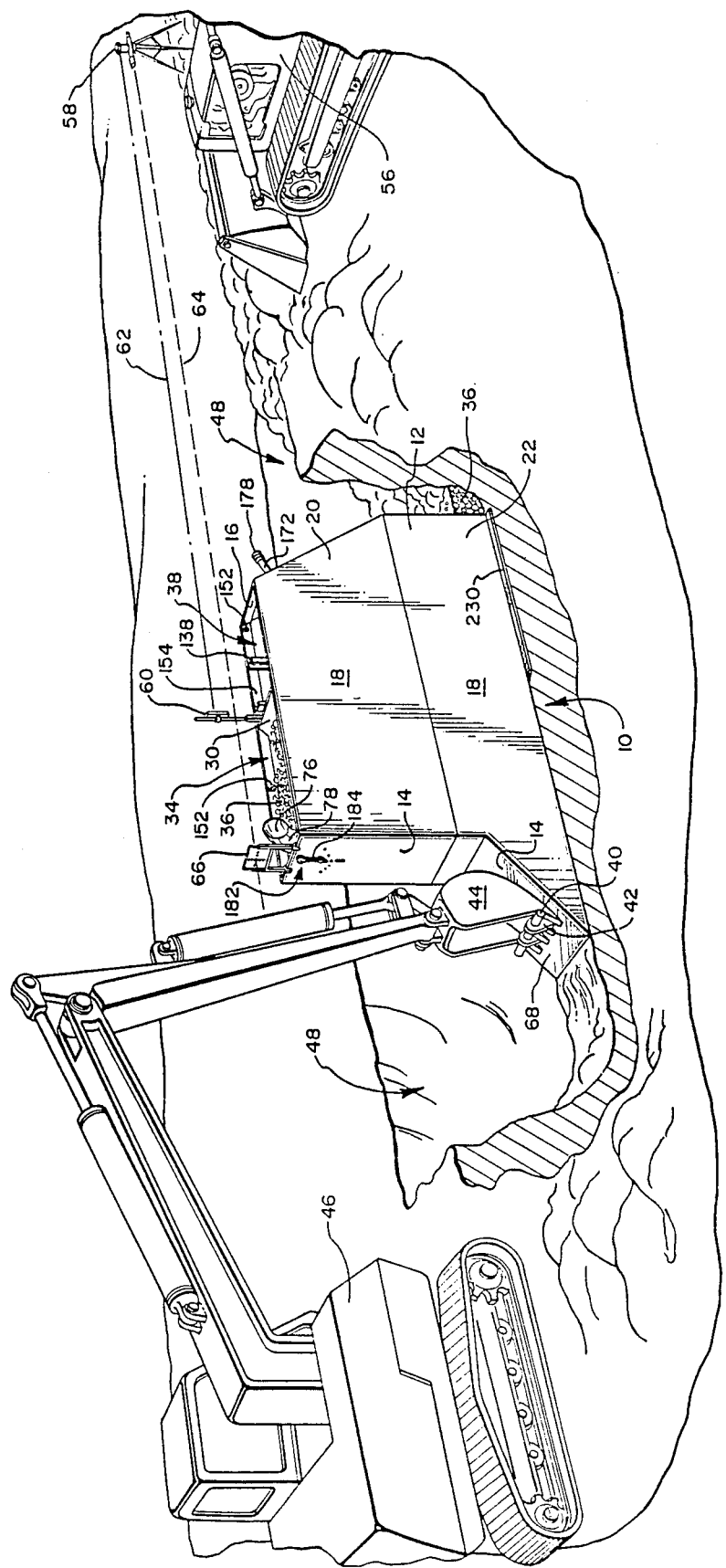
FIG. 1 is a perspective view of the apparatus of the present invention wherein a portion of the trench wall is cut away to show the apparatus, a backhoe bucket engaging the tow bar portion of the apparatus, a front end loader back filling the trench, and the disposition of a portion of the grade and alignment maintenance system.

The boxlike structure 12 further comprises a tow bar 40 mounted on the forward end wall 14. The tow bar 40 is disposed in brackets 42 which are rigidly mounted on the forward end wall 14 of the lower portion 22 of the boxlike structure 12. The tow bar 40 is spaced from the forward end wall 14 sufficiently to receive the teeth of a bucket 44 of an excavating implement 46 substantially as shown in FIG. 1. When the bucket 44 of an excavating implement 46 (e.g. a backhoe) grasps the tow bar 40 in the manner illustrated in FIG. 1, the operator of the excavating implement 46 can apply downward force against the end wall 14 while simultaneously pulling on the two bar 40 to advance the boxlike structure 12 within the trench, thereby lowering the boxlike structure 12 within a trench 48. Lifting force may be applied to lift the boxlike structure 12 within the trench 48 by curling the bucket 44 in about the tow bar 40 and pulling up on the tow bar 40 while pulling force is applied against the tow bar 40 to advance the boxlike structure 12 within the trench 48. It has been found that the tow bar configuration illustrated and described herein enables the operator of the excavating implement 46 to maneuver the apparatus for laying conduit 10 within the trench 48 with remarkable on-grade precision because he can apply vertical, longitudinal and lateral forces as needed to maintain grade. Thus, the task of maintaining the boxlike structure 12 positioned so that conduit can be laid on-grade and in alignment is appreciably assisted by the tow bar configuration.

The boxlike structure 12 further comprises features for securing the upper portion 20 to the lower portion 22 in an aligned and flush engagement. The features also permit the releasable attachment of the upper portion 20 to the lower portion 22. These features include engagement members 50, receiving members 52, and latches 54 which will be described with more particularity hereinbelow.

Turning now particularly to FIG. 1, the apparatus for laying conduit within a trench 48 is illustrated within the trench 48. An excavating implement 46 such as a backhoe clears the earth away from the forward end of the boxlike structure 12. The excavating implement can then grasp the tow bar 40 and pull the boxlike structure 12 forward within the trench 48. When fill material 36 is disposed within the fill bin compartment 34, as the boxlike structure 12 is advanced forward, a layer of fill material 36 is deposited on the floor of the trench 48. Conduit (not shown) is lowered into the conduit laying compartment 38 for positioning on the layer of fill material 36 in alignment and on-grade. The lowering and positioning of the conduit within the trench can be done manually or with the assistance of conduit-setting system, while the excavating implement continues to excavate the trench 48 forward of the boxlike structure 12. Obviously, if a worker is positioned within the conduit laying compartment 38, the side walls 18 of the boxlike structure 12 protect the worker against the collapse of the trench walls.

As the boxlike structure 12 is advanced within the trench 48, it is preferred that a small loader 56 fill the fill bin compartment 34 with fill material 36 as needed. Thus, the excavating implement 46 is free to excavate trench 48 and advance the boxlike structure 12. There is no particular need to provide additional heavy equipment. The same small loader 56 can promptly back fill the trench 48, as shown in FIG. 1.

It has been determined that with most ground conditions, the apparatus 10 of the present invention enables the underground contractor to move less than half the material that is normally required during trenching operations. Thus, there is correspondingly less than half the material to be back filled into the trench 48 once the conduit has been set. Because material movement has been minimized, the trenching operation advances more rapidly. Also, since the excavating implement 46 does not lay idle while conduit is being set within the trench 48, but it is used to excavate the trench 48 in advance of the boxlike structure 12, the excavating implement 46 is being used continuously and much more efficiently. These efficiencies significantly increase the amount of conduit that can be laid in a trench 48 per day. On any project for laying subterranean conduit, this can mean drastic savings in equipment rental costs and labor costs.

In order to insure that the conduit is laid in alignment and on-grade, a preferred embodiment of the present invention also comprises a grade maintenance assembly. The grade maintenance assembly comprises a laser transmitter 58 which transmits signals to a laser receiver 60 which determines the depth of the trench 48 at the point where conduit is being laid. In one preferred embodiment, the laser transmitter 58 transmits at least two types of signals, a sweeping signal 62 which is received by the laser receiver 60 and an alignment signal or beam 64 which strikes a target 66 mounted on the boxlike structure 12. The manner in which the grade and alignment maintenance assembly operates is described with more particularity below.

In FIG. 2 a preferred embodiment of the present invention is shown in which the relative disposition of the internal components are illustrated. In this preferred embodiment, the boxlike structure 12 has an angled nose portion 68 and a floor 70. The angled nose portion 68 inclines downwardly to a cutting edge at the bottom of the boxlike structure 12. The angled nose portion 68 and floor 70 assist in shearing on-grade the bottom of the trench 48 to maintain the boxlike structure 12 on-grade. Since the bucket 44 of the excavating implement 46 is used to apply force on the forward end wall 14, it is preferred that gussets 72 be provided so that the structural integrity of the angled nose portion 68 is maintained.

A preferred embodiment, as illustrated in FIG. 2, further comprises a flexible conduit feed assembly 74 having an inlet 76, a feed tunnel 78 and a plate 80 with a discharge sleeve 82. The feed tunnel 78 may be separated at junction 84 (as shown in FIG. 3) to accommodate the separation of the boxlike structure 12. The lower portion of the feed tunnel 78 has a flared end 86 which receives the upper portion of the tunnel 78 so that when flexible conduit is fed through the feed tunnel 78 it will not snag or hang up within the feed tunnel 78.

Figure 6:
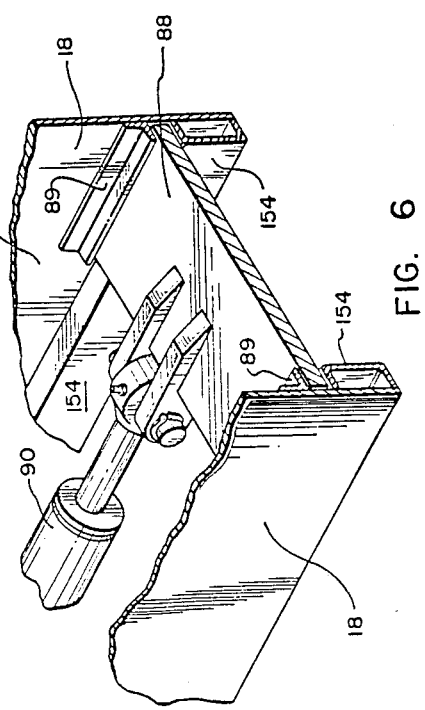
FIG. 6 is an enlarged perspective cut-away view along line 6—6 of FIG. 4 showing the fill material shut-off gate of one present embodiment.

Also illustrated in the preferred embodiment shown in FIG. 2 is a fill material shut-off gate 88 which is operated by a ram 90. As shown at FIG. 6, the fill material shut-off gate 88 rests on channel braces 154 and beneath angle braces 89. The ram 90 operates to move the fill material shut-off gate 88 in a longitudinal reciprocating motion between open and closed positions. When the fill material shut-off gate 88 is open, it permits fill material 36 stored within the fill bin compartment 34 to slide down the interior fill material slide wall 26 to the bottom of the trench 48. When the upper portion 20 of the boxlike structure 12 is separated from the lower portion 22, it becomes necessary to close off the upper portion of the fill bin compartment 34 so that fill material 36 is not spilled into the working area. To accomplish this, the ram 90 pushes the fill material shut-off gate 88 forward to its closed position.

The forward end wall 14, the floor 70, the side walls 18 and the interior fill material slide wall 26 define an enclosed compartment 92 for the preferred embodiment illustrated in FIG. 2. The enclosed compartment 92 houses a dewatering system for the apparatus for laying conduit 10. The dewatering system comprises a plurality of vent openings 94 and a water collection and discharge assembly 96 which collects ground water which accumulates through seepage within the enclosed compartment 92 and removes it from the boxlike structure 12 for discharge remote from the trench 48.

In one preferred embodiment the fill material 36 is struck off as it is dispensed from the fill bin compartment 34. Striking off of fill material 36 is accomplished by a leveler gate 98. The leveler gate 98 is operated in its vertical movement by a ram 100 and laser receiver mast 102 which communicates with the laser receiver 60. In the preferred embodiment illustrated, the laser receiver mast 102 comprises a push rod 104 which engages a shoulder 106 connected to the upper mast rod 108. The upper mast rod 108 is held in position adjacent to the side wall 18 by guide mounts 110 and a nub 112 prevents the upper mast rod 108 from falling through the guide mounts 110 when the upper portion 20 of the boxlike structure 12 is detached and lifted from engagement with the lower portion 22.

Attached to the leveler gate 98 can be a notching gate 114 which is used to carve a notch 194 in the layer of fill material 36 to accommodate the bell of a conduit. The notching gate 114 is actuated by an assembly comprising a roller arm 116 connected to a sensing ram 118 which communicates to a responsive ram 120 which is mounted between the notching gate 114 and leveler gate 98. The roller arm 116 is designed to travel the contour of the upper surface of a conduit 125 (as shown in FIG. 3) so that any changes in the contour are communicated to the sensing ram 118 which conveys that change in contour via tube 122 to the responsive ram 120. The responsive ram 120, then in response to the signal from the sensing ram 118 actuates the vertical movement, either up or down, of the notching gate 114. As shown in FIG. 2, the leveler gate 98 and notching gate 114 are disposed within guide channels 124 which permit the vertical sliding movement of the leveler gate 98 and notching gate 114.

In order to lower conduit 125 into the boxlike structure 12 of the preferred embodiment illustrated in FIG. 2, a conduit lowering assembly 126 is provided. The conduit lowering assembly 126 comprises a grasping mechanism 128 and a conveyance mechanism 130. The grasping mechanism 128 is used to grasp and hold securely a conduit 125 for safe lowering into the trench 48. The grasping mechanism 128 comprises a guide tube 132, a sliding member 134 and an eyelet 136 used to suspend the grasping mechanism 128 during raising and lowering of the conduit 125 onto support arms 142 of the conveyance mechanism 130. The conveyance mechanism 130 comprises a pair of rails 138 secured to the inside of one of the side walls 18 of the boxlike structure 12 and a lowering member 140 comprising support arms 142, a support plate 144, and rollers 146 which permit movement of the lowering member 140 vertically within the conduit laying compartment 38.

A primary feature of the preferred embodiment of the apparatus 10 of the present invention, is its separability into an upper portion 20 and a lower portion 22. This separability introduces tremendous versatility to the apparatus 10. The separation of the boxlike structure 12 facilitates transport of the apparatus 10 because the upper portion 20 and lower portion 22 can be laid on their sides and stacked one on top of the other on a flat bed trailer that can be easily towed by a pick-up truck. This enables transport without any problems due to the limited heights of highway with overpasses or underpasses and also facilitates the storage of the apparatus 10 because it can be placed on a trailer and transported to a storage facility.

Figure 4:
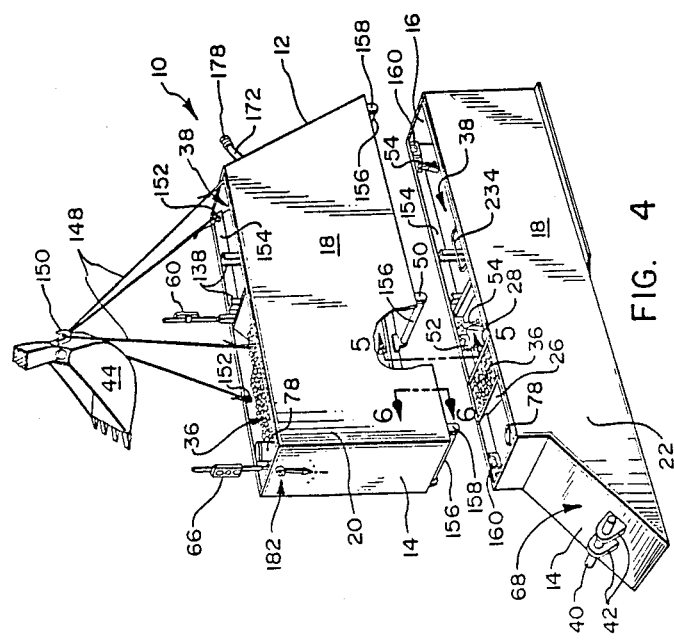
FIG. 4 is a perspective view of the apparatus with the upper portion thereof being lifted clear of the lower portion and showing the mechanism by which the upper portion aligns and nests squarely in the lower portion.

The assembly and disassembly of the apparatus 10 can be accomplished rapidly and without any complexity. When assembling the apparatus 10, the upper portion is always assured of properly square alignment because the engagement members 50 are configured to register with the receiving members 52 for nesting engagement. As illustrated in FIG. 4, the upper portion 20 of the boxlike structure 12 can be lifted from or lowered onto the lower portion 22 using cables 148 connected to the bucket 44 of the excavating implement 46. Cables 148 are draped over a hook 150 on the bucket 44 and secured to the upper portion 22 at lifting ears 152. When suspended as shown in FIG. 4, a worker can easily maneuver the suspended upper portion 20 laterally or longitudinally so that the engagement members 50 align in register with the receiving members 52.

Figure 5:
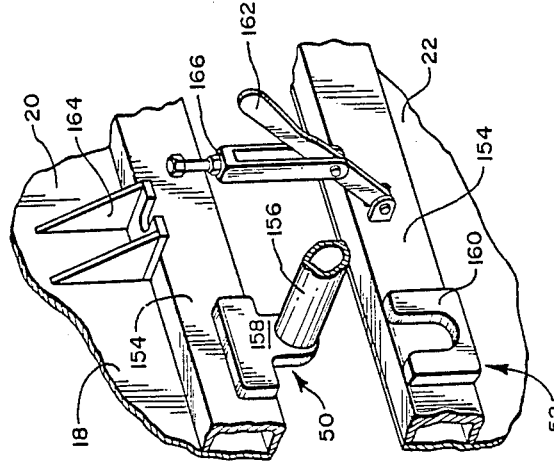
FIG. 5 is an enlarged cut-away view along line 5—5 of FIG. 4 showing an engagement member in register with a receiving member and a latch used to secure the upper portion to the lower portion of the apparatus.

As best shown in FIG. 5, the upper and lower portions 20 and 22 have channel braces 154 attached at the edges of the upper and lower portions 20 and 22. Mounted on the channel brace 154 for the upper portion 20 are the engagement members 50 which comprise a transverse rod 156 mounted between brackets with a U-shaped portion 158 which extend below the lower edge of the upper portion 20 of the boxlike structure 12. Mounted on the channel brace 154 of the lower portion 22 of the boxlike structure 12 are the receiving members 52 which comprise a U-shaped cup 160. When the upper portion 20 is properly aligned, the U-shaped portion of the brackets 158 nest in the U-shaped cups 160 as shown in FIG. 2. Latches 54 can then be secured to prevent the upper portion 20 from movement with respect to the lower portion 22. The latches 54, as best shown in FIG. 5, are preferably a lever and catch assembly having a lever 162, a catch 164 and an adjustable connected 166 which engages the catch 164 in securing engagement. Although the preferred embodiment is a lever and catch assembly, it should be understood that other types of locking or securing means may be used.

When lifting the upper portion 20 from the lower portion 22, the latch 54 is disengaged, cables 148 are draped over the hook 150 attached to the excavating implement bucket 44 and secured to lifting ears 152. If there is some material 36 in the fill bin compartment 34, the fill material shut-off gate 88 is closed so that no fill material 36 will spill from the compartment 34. Then, the bucket 44 lifts the cables 148 attached to the upper portion 20, thereby lifting the upper portion 20 from the lower portion 22.

This feature is particularly useful during the conduit laying operation when an obstacle such as a utility line is encountered. In such instances, the boxlike structure 12 is pulled near the utility line and the upper portion 20 of the boxlike structure 12 removed and lifted out of the trench 48, thereby permitting clearance of the lower portion 22 beneath the utility line. The laying of conduit 125 can recommence using only the lower portion 22 of the boxlike structure 12. Of course, some of the features are not available when using only the lower portion 22. However, the use of the lower portion 22 significantly aids the laying of conduit 125 beneath the utility line. A considerable amount of time savings is afforded by using this procedure because with the lower portion 22 remaining in the trench 48, the amount of earth required to be removed in sloping back the trench walls is significantly reduced and use of the lower portion 22 still enables the operator to lay a uniform layer of fill material 36 on the bottom of the trench 48.

Once the lower portion 22 of the boxlike structure 12 clears the utility line, the upper portion 20 can be lowered back into the trench 48, aligned, squarely seated, and secured in nesting engagement with the lower portion 22 so that normal conduit laying can recommence. It should be understood that where the boxlike structure 12 is equipped with multiple separations (see, for example, FIG. 12), the boxlike structure 12 can be separated at any of these separations to avoid an obstacle.

During use of the apparatus 10 of the present invention, ground water may seep into the trench 48 from the water table. Ground water seepage problems are particularly prevalent when a trench boot, such as the apparatus 10 of the present invention is parked within the trench 48 for any substantial period of time, such as overnight. If a sufficient amount of ground water seeps into the area of the conduit laying compartment 34, it can cause significant problems with the conduit laying operation.

Figure 8:
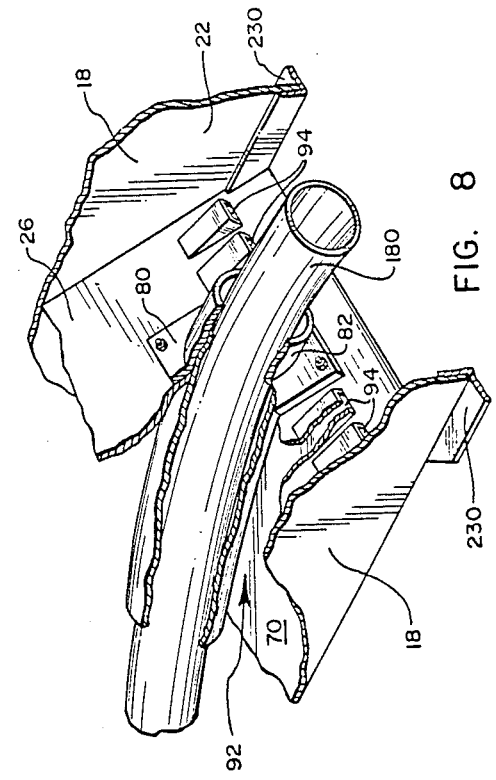
FIG. 8 is an enlarged perspective cut-away view showing vent openings on an interior transverse wall near the bottom of the apparatus and also showing the discharge end of the flexible conduit feed assembly with a flexible conduit being discharged therethrough.

With one preferred embodiment, ground water seeping into the boxlike structure 12 is permitted to pass through the interior fill material side wall 26 at vent openings 94 as shown in FIG. 8. Ground water passing through such vent openings 94 accumulates within the enclosed compartment 92. The ground water accumulating in the enclosed compartment 92 can be collected and withdrawn from the boxlike structure 12 by using the water collection and discharge assembly 96. As shown in FIGS. 2 and 3, the water collection and discharge assembly 96 comprises a pump 168 with a suction screen 170 which collects the ground water and discharges it through an exhaust tube 172 which exits at the rear of the boxlike structure 12 to facilitate discharge of the ground water remote from the trench 48.

It is preferred that the exhaust tube 172 has a separable coupling 174 whereby the exhaust tube 172 can be separated when the upper portion 20 of the boxlike structure 12 is lifted from the lower portion 22. It is also preferred that the exhaust tube 172 be enclosed in or integral with a channel support member 176 which runs along a side wall 18 of the boxlike structure 12 to the point of exit through the rear wall 16. This channel support member 176 provides added stabilizing support to the side wall 18. A coupling 178 is provided near the rear wall 16 so that a hose or tube can be connected to the exhaust tube 172 which will direct the ground water being discharged to a point remote from the trench 48. Although the water collection and discharge assembly 96 described herein and shown in FIGS. 2 and 3 comprises a pump 168 disposed within the enclosed compartment 92, it should be understood that other water collection and discharge assemblies may be used. For example, the pump 168 may be disposed at a point outside the trench 48 and connected to the enclosed compartment 92 via a suction tube and a suction screen 170.

When laying conduit in an area exhibiting a particularly high water table, in which water seepage becomes a significant problem, the water collection and discharge assembly 96 may be operated continually during use of the apparatus 10 so as to extract as much ground water as possible. It should be understood that a dewatering system similar to that shown in FIGS. 2 and 3 could be adapted for use with other embodiments of the invention.

When possible, and as needed, it would be a tremendous time and cost savings to lay flexible conduit and rigid conduit simultaneously. When done, a single trench 48 would be excavated. Earth within the trench would be removed and back filled but once, and subsequent location of the conduits, if necessary for repair or replacement, could be easily accomplished. A preferred embodiment of the apparatus 10 of the present invention has a flexible conduit feed assembly 74 which provides a feed tunnel 78 through which flexible conduit 180 can be directed. As the boxlike structure 12 of the present invention is advanced within the trench 48, flexible conduit 180 can be continuously fed through the inlet 76 into the feed tunnel 78. The flexible conduit 180 exits the feed tunnel 78 at the discharge sleeve 82. In this manner, when fill material 36 is being deposited in a layer on the bottom of the trench 48, the flexible conduit 180 is enveloped in the layer of fill material 36. The discharge sleeve 82 is centrally disposed sufficiently above the floor 70 of the boxlike structure 12 such that fill material 36 is deposited beneath any flexible conduit 180 being fed into the fill material 36 envelope as shown in FIG. 8. As flexible conduit 180 is laid within the envelope of fill material 36, rigid conduit 125 can be simultaneously laid on the surface of the fill material 36 layer.

If a project does not require the simultaneous laying of flexible conduit 180 and rigid conduit 125, the plate 80 having the discharge sleeve 82 may be removed and replaced with a flat plate 80. In this manner, fill material 36 is free to slide over the flat plate 80 to the bottom of the trench 48.

In the various preferred embodiments of the present invention, a number of features may be provided which assist the operator of the apparatus 10 in maintaining the apparatus 10 in alignment and on-grade. As mentioned above, certainly the angled nose portion 68 in conjunction with the floor 70 assist in shearing the bottom of the trench 48 and holding the boxlike structure 12 on-grade. Also, as will be described in detail hereinafter, the automatic adjustment of a shearing edge so as to shear the bottom of the trench on-grade is a great help to the operator. These features also make it unnecessary to over-excavate the trench 48. Another feature is the tilt indicator 182 which provides a visual indication whether the boxlike structure 12 is being maintained on the vertical. The tilt indicator 182 comprises a pendulum pointer 184 mounted on the forward end wall 14 of the boxlike structure 12 on a pivot pin 186 which permits the pendulum pointer 184 to freely rotate about the pin 186. Markings 188 are provided to assist the operator in determining visually whether the boxlike structure 12 is being maintained in a vertically upright position.

Another feature which assists in maintaining the apparatus 10 on-grade and in alignment is the laser transmitter/receiver assembly briefly mentioned above. That assembly in one embodiment comprises the laser transmitter 58, the laser receiver 60, the target 66, the leveler gate 98 and the laser receiver mast 102. With the laser transmitter/receiver assembly, the depth of the trench 48 may be maintained at a uniform depth by maneuvering the apparatus 10 within the trench by applying lifting or downward forces as needed on the tow bar 40.

In one preferred embodiment, the laser transmitter 58 is disposed in a position where it will remain undisturbed by the excavation and conduit laying activity. The disposition of the laser transmitter 58 can be either external of, or within, the trench 48 depending on the depth of the trench 48 and the height of the boxlike structure 12. It is important, however, that the signals from the laser transmitter 58 be unobstructed. The laser transmitter 58 provides a sweep signal 62 on a horizontal plane and an alignment beam 64 on a direct line parallel to the alignment desired for the conduit 125 being laid. The laser receiver 60 receives the sweep signal 62 and can determine via its sensing capability whether the bottom of the trench 48 is being maintained on-grade, above-grade or below-grade. The laser receiver 60 has photo cells which sense the sweep signal 62 and in turn actuate a hydraulic valve (not shown) which is in communication with and actuates ram 100 such that when the sweep signal 62 received indicates that the boxlike structure 12 is below-grade, the ram 100 lifts the leveler gate 98 to compensate for the amount that the boxlike structure 12 is below-grade. If the boxlike structure 12 is above-grade, the laser receiver 60 communicates with ram 100 such that ram 100 extends leveler gate 98 to compensate for the amount the boxlike structure 12 is off-grade. As the leveler gate 98 is raised or lowered by ram 100, the push rod 104 attached to leveler gate 98 is raised or lowered accordingly. The push rod 104 abuts shoulder 106 which is attached to the upper mast rod 108. Movement of push rod 104 is transmitted through shoulder 106 to the upper mast rod 108 such that it slides up and down within guide mounts 110. Thus, the laser receiver 60 attached to the uppermost end of the upper mast rod 108 is raised or lowered the same amount as the leveler gate 98. In this manner, the laser receiver 60 is adjusted upward and downward corresponding to the upward and downward movement of the leveler gate 98 whereby a uniform trench depth is maintained despite slight variations caused when moving the boxlike structure 12 within the trench 48.

Not only does operation of the grade maintenance features provide accurate on-grade laying of conduit, they also reduce tremendously the amount of fill material 36 that is wasted. Where no angled nose 68 is used to shear off the bottom of a trench 48 nor laser transmitter/receiver assemblies used to maintain uniform trench depth, the trenches 48 are frequently overexcavated to assure that there is a minimum amount of fill material 36 base beneath the conduit 125. It is not unusual for the fill material 36 layer to be a couple of feet thick in some places to assure that a minimum half foot layer of fill material 36 is placed beneath the conduit 125. Such wasting of fill material 36, is time consuming and expensive.

Maintenance of the boxlike structure 12 in alignment while pulling it through the trench 48 is assisted by a visual display on target 66. The laser transmitter 58 provides an alignment beam 64 which is set parallel to the alignment desired for the conduit. As the alignment beam 64 strikes target 66, a visual display of the beam on the target 66 enables the operator to adjust for alignment and grade according to the degree of displacement of the alignment beam 64 from the center of the target 66.

Another feature which facilitates maintaining the conduit 25 in alignment along the surface of the fill material 36 is the notching assembly which carves a notch 194 in the surface of the fill material 36 to accommodate the bell for a conduit 125. As mentioned above, the notching assembly comprises a notching gate 114, a roller arm 116, and a sensing ram 118 connected to a responsive ram 120 by a tube 122 (See FIG. 2). In practice, the roller arm 116, having a roller 190 and a delay extension 192, engages the upper surface contour of a previously laid conduit 125, as shown in FIG. 3. As the roller 190 engages the bell of the conduit, the roller arm 116 forces sensing ram 118 to contract, and that contraction signals the responsive ram 120 to actuate the extension of notching gate 114. When extended as shown, the notching gate carves a notch 194 in the surface of the fill material 36. As the roller 190 travels over the bell, delay extension 192 continues to engage the bell such that an oversized notch 194 is carved in the fill material 36 so as to accommodate the longitudinal movement of a conduit 125 when the conduit 125 is being aligned and set with the next previously set conduit 125. By providing notches as shown in FIG. 3, each conduit is maintained as close to level and on-grade as possible.

The conduit lowering assembly 126 of the present invention not only assists in lowering of conduit 125 into the conduit laying compartment 38 but also assists in maintaining the conduit 125 in alignment as it is positioned and set for its final disposition on the surface of the fill material 36 layer. The conduit-lowering assembly 126 comprises a grasping mechanism 128 and a conveyance mechanism 130. The grasping mechanism 128 comprises a guide tube 132 within which a sliding member 134 is provided. The grasping mechanism further comprises at least one clamp 196 disposed to clamp onto the barrel portion of a conduit 125. The clamp 196 is attached to the guide tube 132, and it is preferred that clamp 196 have interchangeable jaws 198 to accommodate various sizes of conduit 125. The jaws 198 can be changed by disengaging bolts 200 and replacing one size of jaws 198 with another size and resecuring bolts 200 (see FIGS. 10 and 11). It is preferred that the clamp 196 be releasable and spring loaded such that as the jaws 198 of the clamp are closed about a conduit 125 a spring holds the clamp jaws 198 snugly against the conduit 125.

To release the jaws 198 from grasping engagement of a conduit 125, means for triggering the release is required. To accomplish this grasping/releasing function, the spring-loaded clamp utilizes an off-center clamping mechanism wherein the jaws 198 of the clamp 196 are held in a grasping position by a spring (not shown) when a clamp roller 202 is disposed in its lowermost position. To achieve this position, a handle 204 is provided whereby a user can manually lock the clamp jaws 198 into grasping engagement by swinging the handle 204 to its substantially horizontal locking position. To release the clamp 196 the clamp roller 202 is engaged and lifted or the handle 204 can be manually lifted to release the grasping engagement of jaws 198 on the conduit 125.

The sliding member has disposed at one end a hooking finger 206 which engages and supports the bell end of the conduit 125. The sliding member 134 has at its other end a centering guide 208 comprising curved arms 210 with rolling cylinders 212 which engage the bell portion of the previously laid conduit 125, a bell stop 214 and trigger 216.

Figure 10:
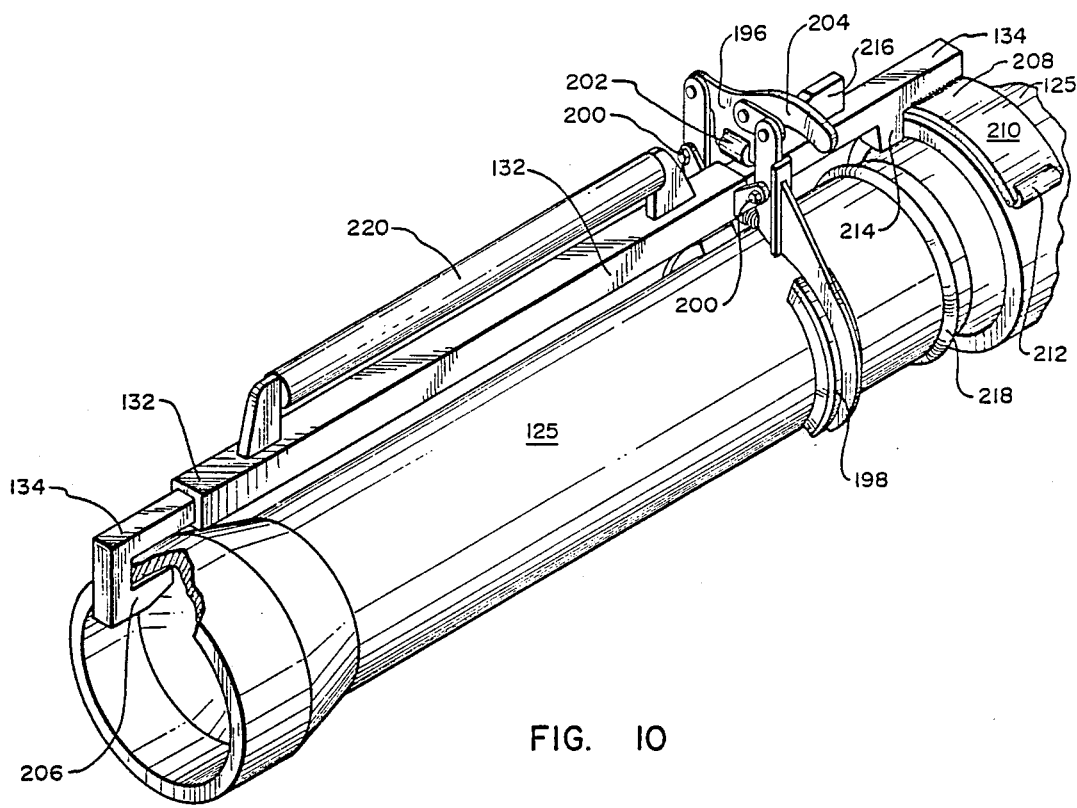
FIG. 10 is an enlarged perspective view of the grasping mechanism used in the conduit-lowering assembly showing a conduit in grasping engagement.
Figure 11:
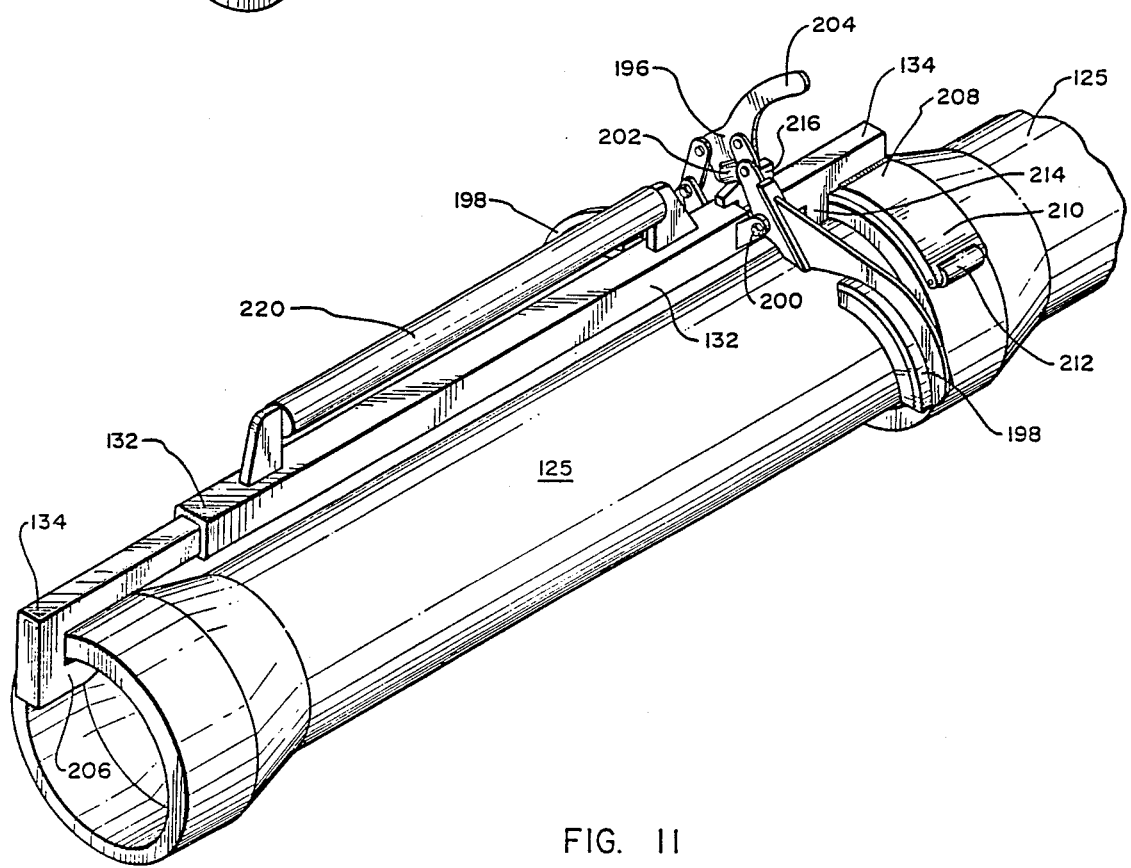
FIG. 11 is an enlarged perspective view of the grasping mechanism used in the conduit-lowering assembly showing the clamp of the grasping means being released.

The sliding member 134 is free to move longitudinally within guide tube 132 until a conduit 125 is grasped within the grasping mechanism 128. FIG. 10 illustrates a conduit 125 just before engagement with a previously laid conduit 125. In FIG. 10, the hooking finger 206 is shown supporting the bell portion of the conduit 125 and the clamp 196 grasping the barrel portion of the conduit 125. As the conduit 125 is advanced towards its setting engagement with a previously laid conduit 125, the sliding member 134 slides within guide tube 132 such that the trigger 216 engages the clamp roller 202 in lifting engagement as shown in FIG. 11. The trigger 216 engages the guide tube 132 thereby preventing any further sliding movement of sliding member 134 within the guide tube 132. When this happens, further advancement of the conduit 125 will release the hooking finger 206 from its supporting engagement of the bell portion of the conduit 125. In this manner, the grasping mechanism 128 is completely released from the conduit 125 as that conduit 125 is set and sealed within the next previously laid conduit 125. To assure a tight and leakproof seal, a gasket 218 is disposed at the connection end of the conduit 125.

Once released, the grasping mechanism 128 may be secured in grasping engagement to another conduit 125 in the same manner as previously described.

When the grasping mechanism 128 secures a conduit 125 in grasping engagement, the conduit 125 may be lowered manually into the conduit-laying compartment 138, or as is preferred, a conveyance mechanism 130 may be used to assist in lowering and aligning the conduit 125. The conveyance mechanism 130 comprises a pair of rails 138 and a lowering member 40, which comprises support arms 142, a support plate 144, and rollers 146. The lowering member 140 moves vertically as guided by the rails 138. To lower a conduit 125 into the conduit laying compartment 38, the grasping mechanism 128 is positioned to be suspended via a suspension bar 220 which is mounted on the guide tube 132. The suspension bar 220 engages centering notches 222 in the support arms 142 such that the conduit 125 is suspended centrally within the boxlike structure 12 and in alignment with the desired alignment for the laying of conduit. The lowering member 140 may be gradually lowered into the conduit laying compartment 38 via any conventional manner such as manually lowering the member on a rope or cable, or by use of counterweights, or by a powered chain and sprocket drive, or by using a hydraulic ram which would raise or lower the lowering member 140 in response to hydraulic signals controlled manually.

Figure 9:
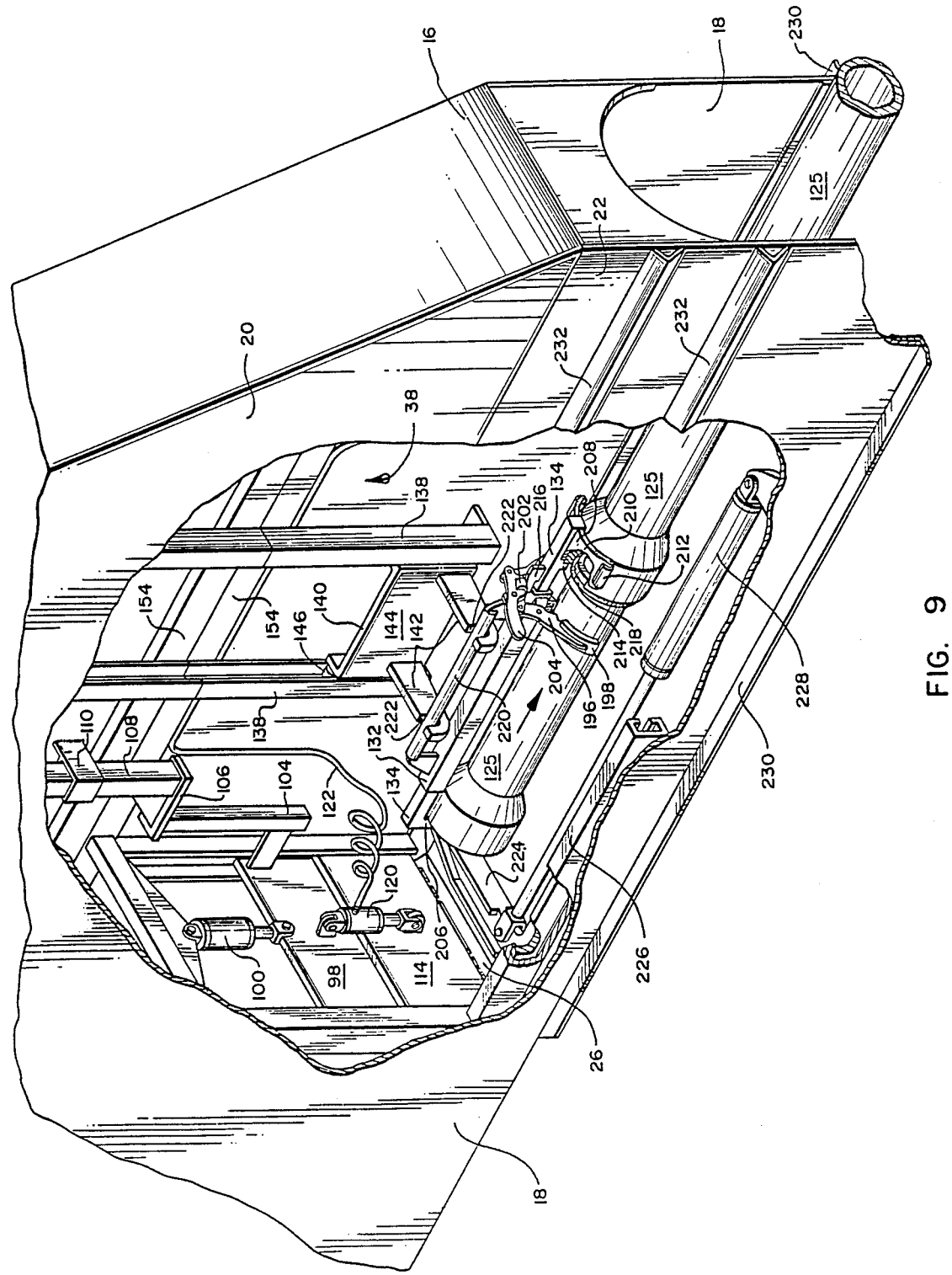
FIG. 9 is an enlarged perspective cut-away view of the apparatus viewed from the rear in which a side wall is partially cut away to show the conduit lowering assembly lowering a section of conduit for alignment and setting.

Thus, to lower a conduit 125 into the conduit laying compartment 38, the grasping mechanism 128 is secured to a conduit 125 in the manner shown in FIG. 10. The grasping mechanism 128 is then suspended on the support arms 142 of the lowering member 140 as shown in FIG. 2. The lowering member 10 is then guided downward by rails 138 to where the conduit 125 reaches the surface of the fill material 36 or the bottom of the trench 48, as shown in FIG. 9. The grasping mechanism 128 is then released from the conduit as the conduit 125 is advanced into setting engagement with the next previously laid conduit 125 as shown in FIGS. 9 and 11. Once released, the grasping mechanism 128 can be lifted from the conduit laying compartment 38 for engagement with another conduit 125 so that the procedure can be repeated.

To advance the conduit 125 into setting engagement with the next previously laid conduit 125, a conduit setter assembly is provided. Such conduit setter assembly comprises a push arm 224 with a guide support 226 and a ram 228. The conduit setter assembly operates on a conduit 125 which has been lowered into the conduit laying compartment 38 but has not been set into the next previously laid conduit. The push arm 224 engages the bell portion of the conduit 125. As ram 228 contracts, the push arm 224 slides within the guide support 226 which is mounted on a side wall 18 so that the push arm 224 applies a horizontal pushing force in the direction as shown by the arrow in FIG. 9. When a grasping mechanism 128 is used to assist in grasping and lowering the conduit 125 into the conduit laying compartment 38, the push arm 224 advances the conduit 125 such that the trigger 216 engages the clamp roller 202 and releases the clamp 196 and the hooking finger 206.

Additional features which are provided for the boxlike structure 12 include stiffeners such as the base stiffeners 230 and the side stiffeners 232 which provide support and rigidity to the side walls 18 of the boxlike structure 12. Also, to facilitate access to the conduit laying compartment 38, as set of step rungs 234 are provided whereby a worker may descend into the conduit laying compartment 38.

Another preferred embodiment of the present invention is illustrated in FIG. 12. This embodiment is particularly adapted for laying substantially rigid plastic pipe within a layer of fill material 36. With this preferred embodiment, the plastic conduit 236 is lowered into the conduit laying compartment 38 which is disposed forward of the fill bin compartment 34. The plastic conduit 236 is positioned for its disposition within a layer of fill material 36 by a rocking arm assembly 238. The rocking arm assembly 238 comprises a pivot pin 240 disposed in pivoting engagement with a pivot bar 242 having a plurality of pivot holes 244. By positioning the pivot pin within any one of the pivot holes 244, the depth of fill material 36 to be disposed beneath the plastic conduit 236 can be adjusted. By way of illustration, if the pivot pin 240 is raised, this would cause more fill material 36 to flow beneath the plastic conduit 236 for support. On the other hand, if the pivot pin is lowered, less fill material 36 would support the plastic conduit 236.

The rocking arm assembly 238 further comprises a rocking arm 246 which pivots on the pivot pin 240. The rocking arm 246 has a trough portion 248 which assists in holding the plastic conduit 236 in alignment. At the distal end of the rocking arm 246 is a roller box 250 having rollers 252 and a housing 254. Attached to the housing 254 can be a thimble 256 through which the plastic conduit 236 is discharged into the fill bin compartment 34 where the plastic conduit 236 is enveloped in a layer of fill material 36.

The plastic conduit 236 is lowered into the boxlike structure 12 substantially as shown in FIG. 12 and is directed to its resting position on the rocking arm 246 by a slide 258. As the plastic conduit 236 drops into position, the bell of the plastic conduit 236 engages touch plate 260 which releases the ram plate 262 which is operated by a ram 264 to advance the plastic conduit 236 into setting engagement with the next previously laid conduit 236.

As the boxlike structure 12 of this preferred embodiment is advanced within the trench 48 in a manner similar to that described herein with regard to other preferred embodiments, the plastic conduit 236 advances along the rocking arm 246 until another section of plastic conduit 236 can be introduced into the line.

To assure that the plastic conduit 236 is laid in alignment and on-grade, a grade maintenance assembly similar to that described above can be used. In the preferred embodiment illustrated in FIG. 12, a laser receiver 60 is provided and is disposed such that the laser receiver mast 102 is encased in a fin 266. Although a fin 266 is shown as a preferred embodiment it should be understood that other configurations for the laser receiver mast and the protection thereof can be used. The laser receiver 60 is in communication with adjustment ram 268 which raises or lowers the roller box 250 in response to the signal received by the laser receiver 60. As the roller box 250 is raised or lowered to compensate for deviations from grade, the laser receiver mast 102 is also raised or lowered accordingly.

Fill material 36 can be placed in the fill bin compartment 34 for disposition at the bottom of the trench. A manually adjustable leveler 268 is provided on the rearmost end of the boxlike structure 12 to strike off the fill material 36. Also, a pair of baffles 270 which angle inwardly from the side walls 18 are provided in order to windrow fill material 36 for support beneath the flexible conduit 236.

Although several of the features with regard to other preferred embodiments are not shown with respect to FIG. 12, it should be understood that many of the features are adaptable for use with the embodiment illustrated in FIG. 12. For example, fill material shut-off gates 88 can be provided at each of the separation levels in order to shut off fill material 36 from spillage when the boxlike structure is separated. Also, a dewatering system similar to that described above can be incorporated into the boxlike structure illustrated in FIG. 12.

Another presently preferred embodiment is shown in FIGS. 13-18. In the embodiment shown in FIGS. 13-18 many of the structures shown are similar or identical to the structures shown in FIGS. 1-12. Therefore, the operation of the embodiments shown in FIGS. 13-18 will be similar, or identical, to those embodiments illustrated in FIGS. 1-12.

Figure 13:
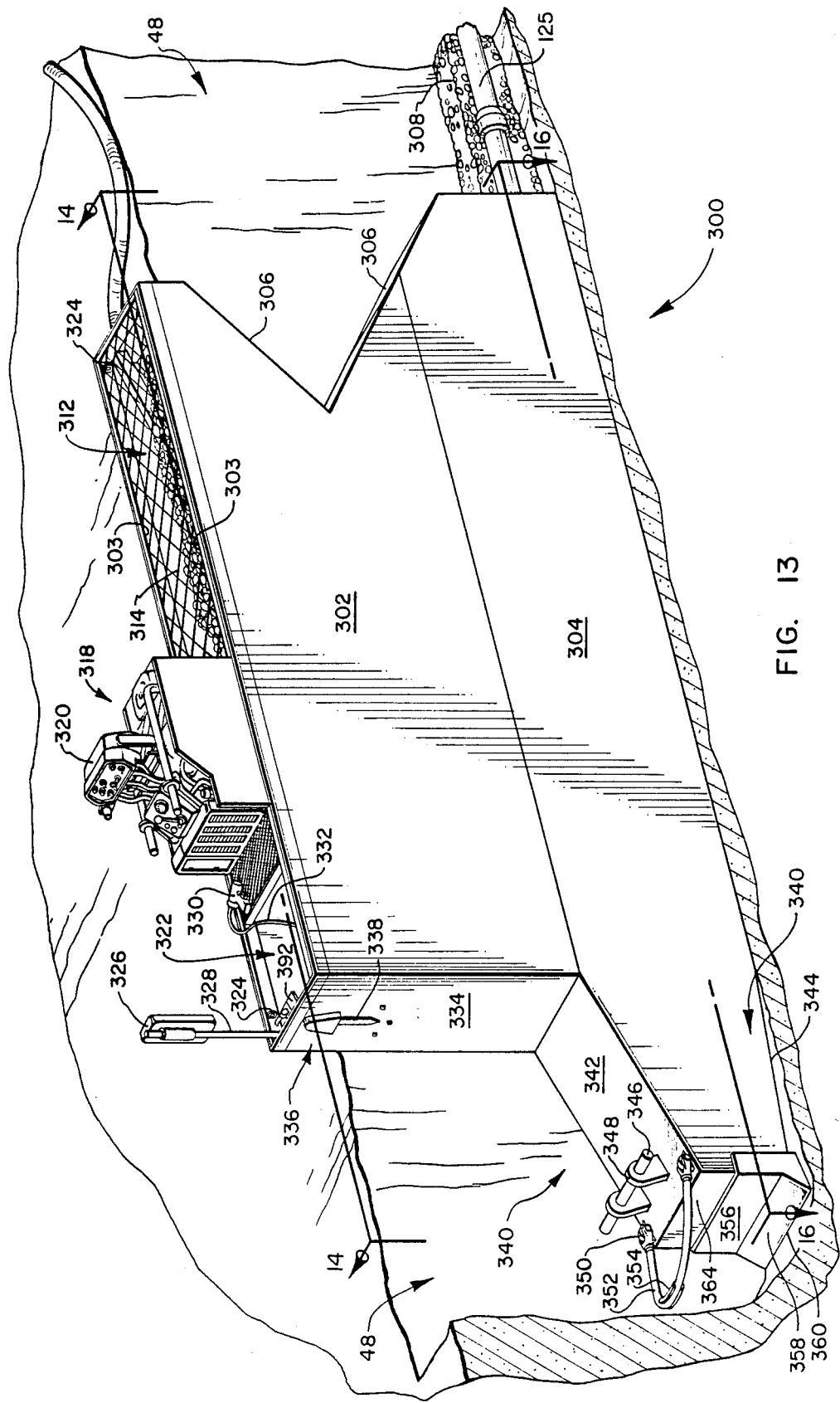
FIG. 13 is a perspective view of another presently preferred embodiment of the present invention wherein a portion of the trench wall is cut away to show the apparatus.

Similarly to the earlier described embodiments, the apparatus for laying conduit within a trench generally comprises a boxlike structure designated 300 in FIG. 13 having a forward wall 334, rear 306, and side walls 303. The boxlike structure 300 is configured so as to separate into an upper portion 302 and a lower portion 304. The seam where upper portion 302 and lower portion 304 separate is designated 310. It should be understood that the boxlike structure 300 may be constructed so as to separate into more then two portions, such as is illustrated in FIG. 12 wherein the boxlike structure is separable into three portions.

Figure 14:
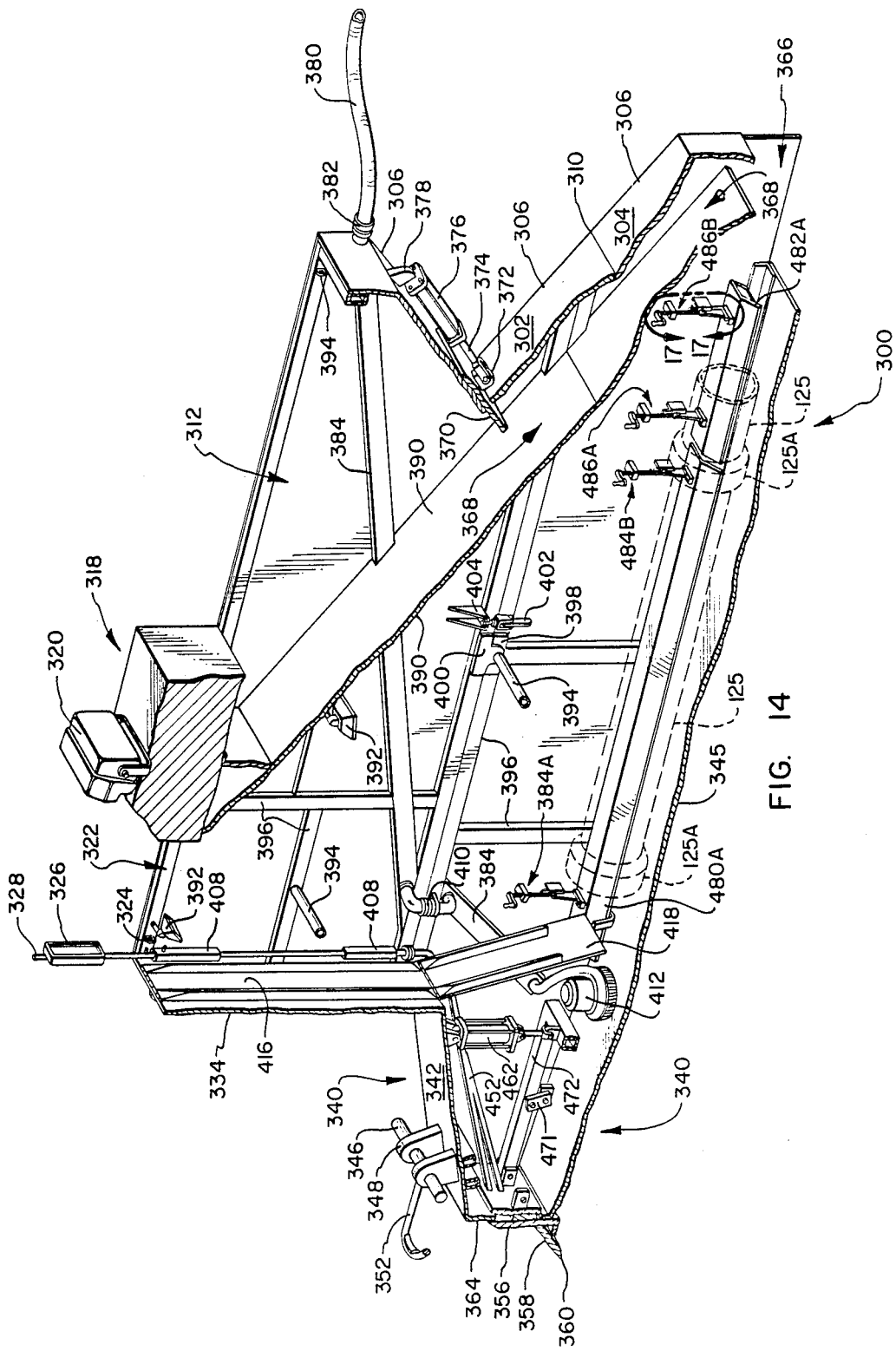
FIG. 14 is a perspective view of the embodiment shown in FIG. 13 with the side wall cut away so that the various features internal of the apparatus can be shown.

In a fashion similar to that shown in FIG. 2, the cross-sectional perspective view of FIG. 14 shows that the boxlike structure is provided with an internal transverse wall 390 which separates the boxlike structure 300 into two separate compartments. Boxlike structure 300 has a fill bin compartment, generally designated 312 in FIG. 13, and a conduit laying compartment, generally designated 322 in FIG. 13. The fill bin compartment 312 is for receiving fill material (shown at 308 in FIG. 13) which is dispensed on the bottom of the trench and around the conduit 125 which is laid in the trench. A screen 314 covers fill bin 312 upper opening. The fill material must pass through screen 314 as it is poured into fill bin 312. The conduit laying compartment 322 provides a passageway for conduit 125, such as heavy cement, clay, or P.V.C. sewage pipe as shown in FIG. 14, to be passed through the boxlike structure 300 to the bottom of the trench. The conduit laying compartment 322 also contains the equipment necessary to properly align, set, and push the conduit out the trailing end of the boxlike structure. As can be seen in FIG. 14, the fill bin compartment is defined by an interior transverse wall 390 and a portion of the rear wall 306. A chute, generally designated 368 in FIG. 14, is provided between the fill bin compartment and the rear exit 366 of the boxlike structure 300.

The boxlike structure 300 further comprises a tow bar 346 and a tow loop 352 mounted on the forward nose section 340 of the boxlike structure 300 as is shown best in FIG. 13. The tow bar 346 is disposed in brackets 348 which are rigidly mounted on the forward nose section 340 of the boxlike structure 300. The tow bar 348 is used in the same manner as hereinbefore described. The tow loop 352 is also provided to allow quick and easy grasping of the tow loop 352 in order to draw the boxlike structure through the trench which has been excavated.

Tow loop 352 is preferably a wire rope loop pivotally attached to eyelet studs 350 and also having a reinforcing section 334.

When the bucket of an excavating implement (e.g. a backhoe) grasps the tow bar in the manner illustrated in FIG. 1, the operator can provide upward, downward or side-to-side forces on the forward end wall while pulling the boxlike structure through the trench. However, due to the automatic shearing blade adjustment mechanism provided in the embodiment shown in FIGS. 13-14, it is not necessary that the implement operator concern himself with careful manipulation of the boxlike structure to keep it on-grade. Thus, on many occasions, the tow loop 352 may be used to draw the boxlike structure through the trench. Still, the tow bar 346 may be used for making adjustments to the grade of the boxlike structure 300 and the implement operator has a choice of utilizing the tow loop 352 or the tow bar 346 for drawing the boxlike structure 300 through the trench, according to the needs of the particular circumstances. The operation of the automatic shearing blade adjustment mechanism will be explained in detail later.

The shearing blade 358, which includes a shearing edge 360, automatically adjusts up or down, as needed, as the boxlike structure 300 is drawn through the trench. Thus, the bottom of the trench 48 is automatically kept on-grade and the operator of the excavating implement may be less concerned with applying vertical forces in order to keep the boxlike structure on-grade as is required with the previously described embodiments.

The structures indicated generally at 318 in FIGS. 13 and 14 comprises a motor which drives an electric generator and a hydraulic pump. The electric generator provides the electric power necessary to operate the laser leveling system used to control the automatic shearing blade adjustment mechanism and also provides electric power for the lights 392 in the conduit laying compartment 322 and various other functions requiring electric power. The hydraulic pump provides hydraulic fluid under pressure required for the various hydraulic rams that are used in connection with the embodiment which will be explained later.

The boxlike structure 300 further comprises features for securing the upper portion 302 to the lower portion 304 in an aligned and flush engagement. This feature also permits the releasable attachment of the upper portion 302 to the lower portion 304. These features include engagement members 400, receiving members 398, and latches 402 which operate in a similar manner to that previously described.

The embodiments shown in FIGS. 13-18 are used in a similar fashion to those embodiments shown in FIGS. 1-12. As is shown best in FIG. 1 in connection with a previously described embodiment, the excavating implement, such as backhoe, digs a trench 48 in front of the boxlike structure 300. FIG. 13 shows the boxlike structure 300 in such a trench 48. The boxlike structure 300 is drawn forward through the trench 48. Conduit 125 is passed through the conduit laying compartment 322 to the bottom of the trench 48. The conduit 125, if composed of individual lengths, are secured together in the bottom of the boxlike structure 300 before being pushed out the rear 336 of the boxlike structure 300 onto the bottom of the trench 48. As the conduit 125 is fed out the rear end 366 of the boxlike structure 300, the fill material 308 (not shown in FIG. 14) is discharged from the fill material chute 368 and envelops the conduit on all sides with fill material 308 as shown in FIG. 13. Thus, the conduit has been laid in the bottom of the trench and is ready for the trench to be back filled immediately, as is indicated in FIG. 1.

As is the case with the embodiment shown in FIGS. 1-12, the embodiment shown in FIGS. 13-14 allows the trenching and conduit laying operation to be performed continuously. The excavating implement continuously digs a trench 48 in front of the boxlike structure 300. The boxlike structure 300 is then drawn forward by the backhoe into the newly dug trench. A front loader, for example, may also be used to supply the fill material bin 312 with gravel or some other fill material, and for back filling the trench behind the boxlike structure 300 with the material which the backhoe has removed. Also, the backhoe may be used to lower the conduit 125 into the conduit laying chamber 322 and for removing the upper portion 302 of the boxlike structure 300 from the lower portion 304, if required.

As will be appreciated, similar to the embodiments previously described, the embodiment shown in FIGS. 13-14 provides that an underground contractor may lay conduit in less than half the time required using previously available structures and methods. Furthermore, since excavating implements, i.e., backhoes, are not sitting idle this expensive equipment is being used much more efficiently. Thus, on any project for laying subterranean conduit, these advantages can produce drastic savings in equipment rental costs and labor costs.

The automatic on-grade adjustment mechanism included in the embodiment shown in FIGS. 13-14 is particularly useful in increasing the efficiency of a conduit laying operation. Since the operator of the excavating implement is not required to give as strict attention to maintaining the boxlike structure 300 on-grade, the conduit laying operation may proceed at an even faster pace than when using the previously described embodiments.

FIG. 15, which is a detailed cross-sectional view of the forward nose portion 340 of the boxlike structure 300, will be used to in explaining the functioning of the automatic on-grade adjustment system. As is the case in the embodiment shown in FIG. 1, a laser transmitter (not shown in FIGS. 13-18) is provided above ground. The level of the beam transmitted by the laser transmitter is set so as to be precisely the appropriate distance above the grade on which the bottom of the trench is to be sheared. In FIG. 14, which is a cross-sectional view of the boxlike structure of the present embodiment, the laser receiver 326 is shown mounted upon a vertically sliding mast 328. The mast is held against the internal side of wall 303 of the boxlike structure by guides 408 which allow the mast to move in a vertical direction, but not horizontally. The laser receiver 326 intercepts the laser beam and, in connection with the receiver control circuitry 320, determines if the laser receiver is above, below, or at the proper height. The internal mechanism contained in the forward nose portion 340 which responds to the receiver control circuitry 302 is shown in more detail in the cross-section view of FIG. 15.

In FIG. 15, the mechanical and hydraulic structure which is responsible for carrying out the automatic shearing blade adjustment can be seen. In FIG. 15, some of the structures are shown when shearing edge 360 is in an intermediate position and are also shown when shearing edge 360A is in a lower most position. A shearing edge 360 is provided on shearing blade 358. The shearing edge 360 of the shearing blade 358 is provided with a point for efficiently shearing off the earth at the proper level. The shearing blade 358 may be constructed of a single piece of material or, as shown in FIG. 15, may be braced with a bracing member 362. The shearing blade is attached to the mounting plate 356 which is in turn attached to the backing plate 468 by bolts 478 and nuts. The nose section forward wall 364 is provided with a hole 476 through which the mounting plate 356 attaches to the backing plte 468. Thus, as the backing plate 468 is raised and lowered, mounting plate 356 is also raised and lowered which causes the shearing edge 360 to be raised and lowered also. Two positions of the components are shown in FIG. 15 by the solid image and the outline image. The boxlike structure bottom 344 along the nose portion is angled upward so as to not interfere with the operation of the shearing edge 358.

The backing plate 468 is connected to a pivoting arm 472. The pivoting arm 472 is pivoted about its approximate mid-point by a two point pivoting member 471. Position of the pivoting point may be altered from that shown in FIG. 15 to provide additional leverage or increased movement of shearing blade 358 as is needed. The structure of the pivoting arm 472 and the two point pivoting member 471 can also be seen in the perspective view of FIG. 14. As seen best in FIG. 15, the two point pivoting member 471 is pivotally attached to the pivoting arm 472 by a volt 473 and also pivotally attached to a mounting member 477 by bolt 475. A second end of the pivoting arm 472 is connected to the rod 466 of a hydraulic cylinder 462. As the rod 466 of the hydraulic cylinder 462 is extended or retracted, pivoting arm 472 is caused to move which in turn causes backing plate 468 and mounting plate 356 to move either up or down.

Since mounting plate 356 and backing plate 468 "sandwich" the front wall 364 of the nose section, mounting plate 356 is restricted from moving in other than a vertical direction. In the embodiment shown in FIGS. 13-15 no particular friction reducing device is used between mounting plate 356, backing plate 468, and the front wall 364 of the nose section. However, such a friction reducing material could be used with the present invention. In the present embodiment it has been determined that constructing mounting plate 356, backing plate 468, and nose section front wall 364 of a material having sufficient strength so as to withstand the pressure created by the earth moving against the shearing blade 358, provides that the friction between these sections is of little concern to the proper operation of the embodiment. Still further, reducing the friction between these structures is difficult because of the infusion of dirt experienced during operation.

The two point pivoting member 471 is necessary, as opposed to a one point pivot, since mounting plate 356 and backing plate 468 are allowed to travel only in a vertical plane. The structure shown in the cross-sectional view of FIG. 15 provides the essential functions of the on-grade adjustment mechanism with a minimum of complicated equipment. The hydraulic cylinder 462 is pivotally mounted to the angled upper wall 342 of the noise portion by brackets 458 and 464 and bolt 460. As can be seen best in the perspective view of FIG. 14, pivoting arm 472 is a tubular-shaped member being formed in a U-shape, the distal ends of the legs of the "U" being pivotally attached to the brackets 470 attached to backing plate 468. The U-shape of the pivoting arm 472 can be seen best in the top view of FIG. 16.

Also apparent from FIG. 16 is that pivoting members 471 are connected to approximately the mid points of each of the "legs" of the pivoting arm 472 by bolts 473. Thus, as the end of pivoting arm 472 which is connected to the hydraulic ram 462 is moved up and down, it travels in a slight arc due to the fact that backing plate 468 is allowed to move only in the vertical plane.

Whether hydraulic ram 462 extends or retracts is determined by whether the laser receiver 326, and its associated circuitry, determines that the shearing edge 360, and thus the bottom of the trench, is above, or on-grade. Thus, if the laser receiver 326 determines that the position of the shearing edge 360, and thus the bottom of the trench, was above-grade in the position shown in the solid image of FIG. 15, the shearing blade adjustment mechanism would cause a solenoid valve to open (not shown) which would cause hydraulic ram 462 to retract cylinder rod 466. This would cause pivoting arm 472 to move and force backing plate 468 and mounting plate 356, and thus also the shearing blade 358, downward in the position shown by the dotted image 358A of FIG. 15.

The height at which the laser receiver 326 is held is determined by the position of the backing plate 468. As can be seen best in FIG. 15, a laser mast support rod 452 is connected to backing plate 468. A reinforcing strut 454 is attached between backing plate and mast support rod 452 so as to provide diagonal support. Mast support rod 452 extends at an angle through the nose portion of the boxlike structure until it comes to a position directly below the laser receiver mast 328. Both the top end of the mast support rod 452 and the bottom end of the laser receiver mast 328 are provided with horizontal flat end members, 451 and 453, respectively. Mast support rod 452 is positioned such that as backing plate is moved vertically a particular distance, the laser receiver mast 468 is also moved the same distance. Mast support rod 452 and laser mast 328 are not secured together so that when the upper portion of the boxlike structure is separated from the lower portion, no connections need be dismantled.

In operation, as the laser receiver determines that the shearing edge 360 is above grade, the pivoting arm hydraulic ram 462 is caused to retract which forces the shearing edge 360 downward while at the same time laser receiver mast 328, and thus the laser receiver 326, is also moved downward the same distance. When the shearing edge 360, and thus the laser receiver 326, has been moved back on-grade, the on-grade condition will be sensed by the laser receiver 326 and the action of hydraulic cylinder 462 will be discontinued. In this fashion, it is not necessary that the boxlike structure be moved up or down by the implement operator to maintain the conduit on-grade but the mechanism of the embodiment illustrated in FIG. 13-15 maintains the bottom of trench 48 on-grade.

The embodiment shown in FIG. 14 is provided with a pump 412 to remove water which collects in the conduit laying compartment 322 portion of the boxlike structure. The pump 412 takes up water from the bottom of the boxlike structure and forces it into a pipe 384 provided on both the lower and upper portion of the boxlike structure. The pipes on the lower and upper portions of the boxlike structure are interconnected by a releasable coupling 410 so as to facilitate the separation of the two portions of the boxlike structure. The water which is discharged from the pipe 384 which exits from the upper portion 382 of the boxlike structure is carried away from the trench by way of a hose 380. As is the case with the previously described embodiments, the water removal function may be provided by many different systems other than that shown in FIG. 14.

The embodiment shown in FIG. 13-14 is particularly well-suited for laying conduits such as heavy cement, clay, or P.V.C. sewage pipe. After the initial length of trench has been excavated to the proper depth, and the boxlike structure placed on the bottom thereof, a length of conduit is lowered through the top of the boxlike structure into the conduit laying compartment 322. As shown in FIG. 14, the forward vertical wall of the conduit laying compartment is provided with a conduit guiding ramp, 416 and 418. The conduit guiding ramp consists of a vertical portion 416 and a sloping portion 418.

To insert conduit into the laying compartment 322, the conduit 125 is lifted from a flatbed truck, or some other supply of conduit, by an excavating implement at the trenching site. The length of conduit is held in a vertical position and placed against the vertical portion 416 of the conduit guiding ramp. As the length is slowly lowered, the first end of the conduit meets the diagonal portion 418 of the conduit guiding ramp. As the conduit 125 is continued to be lowered into the conduit laying compartment 222, it is guided onto the first set of conduit support rails 480A and 480B, one of which is shown in the perspective view of FIG. 14 and both of which are shown in the top view of FIG. 16. The conduit comes to rest in a substantially horizontal attitude on the conduit support rails 480A and 480B, as shown by the ghost images of the conduit 125 illustrated in FIGS. 14 and 16.

The apparatus of the embodiment shown in FIG. 14 is particularly well-suited for laying individual lengths of conduit which have a bell 125A, or a flared portion, at one end. In the embodiment shown in FIG. 14, the exact grade on which the conduit will be laid is determined by the height of the conduit support rails, 480A and 480B as well as 482A and 482B, rather than the depth of the trench. Thus, a structure is provided for raising and lowering the levels of the conduit support rails 480 and 482.

In the present embodiment, the height of the conduit support rails 480 and 482 may be adjusted by screw mechanisms generally designated by the structures marked 484–492. Each section of pipe support rails is provided with two height adjustment screws, making a total of eight shown in FIG. 16.

The structure of the height adjustment screws 484–492 can be seen in detail in FIG. 17. A threaded bracket 492 is attached to the side wall 303 of the boxlike structure through which the screw 494 is placed in threaded engagement. A handle 496 is secured to the end of the screw 494 so as to facilitate rotation of the screw 494 by a workman stationed within the conduit laying compartment 322. The other end of the screw is provided with an opening through which a flat headed button 508 is placed. Thus, the button 508 moves vertically as the screw 494 is rotated without hindering the screw's rotation. The shaft portion of the button 508 protrudes from the center of the screw 494. The shaft portion of button 508 is attached to rail suspension bracket 502 by connector 510.

The pipe support rail 480A is provided with a length of U-channel member 500, shown in FIG. 17, commonly called unistrut in the art, upon which the rail suspension bracket 502 is attached. The use of the unistrut channel member 500 and a nut and bolt 506 to attach the rail suspension bracket 502 to the conduit support rail 480A allows the conduit support rail 480A to be moved horizontally such that different diameters of conduit may be accommodated. The bracket 502 has a flat guide member 504 which is inserted through a bracket 498 protruding from the side wall of the boxlike structure. Thus, by the structure described, the conduit support rails may be positioned both vertically and horizontally. It should be appreciated that many different structures could be used to provide the positioning of conduit guide rails 480 and 482.

With an initial length of conduit being horizontally placed on the first pair of conduit pipe support rails 480A and 480B, and the bottom of the trench being sheared at the proper grade, the continuous chain drive shown in FIG. 18 is activated by a workman supervising the operation. For the convenience of the workman, a remote control for directing the operation of the mechanisms described herein, shown in FIG. 13 at 330, is connected to the control mechanisms of the apparatus by a cable 332. As a length of conduit reaches a horizontal position it strikes conduit sensing switch actuator 542. Conduit sensing switch 540 detects when the conduit has reached the horizontal position on the first pair of conduit support rails 480A and 480B. When the continuous chain 530 is activated, one of two chain drive fingers 536A or 536B meets the end of the conduit 125. The chain drive 530 exerts pressure on the end of the conduit thus pushing the length of conduit 125 out the trailing end of the boxlike structure. Thus, the length of conduit is moved from the first pair of conduit support rails 480A and 480B to the second set of conduit support rails 482A and 482B.

As mentioned previously, the embodiment shown in FIGS. 16–18 is particularly well-suited for laying conduit which has a bell at one end thereof. As shown in FIG. 14, the second pair of conduit support rails 482 may be vertically adjusted so as to be lower than the first pair of conduit support rails 480. Thus, as the initial length of conduit is pushed onto the second pair of conduit support rails 482 the height of the conduit is such that a second length of conduit being placed on the first pair of conduit support rails 480A and 480B is readily slid into sealing engagement with the bell of the initial length of conduit 125. In most cases, the length of the conduit will be such that it will only be partially supported by the second pair of conduit support rails 482 and the conduit will be partially laying in the trench.

The second length of conduit is pushed into sealing engagement with the bell of the initial length of conduit by a conduit setting mechanism shown in FIG. 18. The setting mechanism includes a hydraulic ram 552. Hydraulic ram 552 is attached to conduit support rail 480A by mounting bracket 554. The hydraulic ram rod 556 is connected to an interconnecting bracket 558 which is adjustably positioned within a length of unistrut 560. (The adjusting structure is not shown in the figure.) Also, a push arm 562, which is the structure that makes contact with the end of the conduit, is also positioned within the length of unistrut 560. The conduit setting hydraulic ram 552 used to push the lengths of conduit into sealing engagement is provided with a short stroke since the positioning of the push arm 562 relative to hydraulic ram rod 556 is adjustable. Thus, when conduit is in place on support rails 480A and 480B the conduit need only be pushed a short distance to set the ends of the conduit in sealing engagement.

Once conduit setting hydraulic ram 552 provides that the lengths of conduit are placed in sealing engagement with each other, a task which sometimes requires a considerable amount of pressure which can be provided by a hydraulic cylinder, one of the continuous drive chain fingers, 536A or 536B, is caused to abut the end of the second length of conduit and push both lengths of conduit out of the trailing end of the boxlike structure as the boxlike structure is drawn forward through the trench.

Continuous chain drive 530 is driven by an hydraulic motor 512. A hydraulic motor is used so that constant pressure may be maintained on the conduit even while the conduit is not moving. The motor 512 is driven by hydraulic fluid communicated through hydraulic lines 514. The hydraulic pump is located with the other control mechanisms indicated at 318 in FIGS. 13 and 14. The hydraulic motor base 516 is attached to mounting plate 518 which slides horizontally. The continuous chain 530 is coupled to the motor by a sprocket (not shown in FIG. 18 but indicated at 528A). The horizontal position of hydraulic motor 512 is adjusted by the position of adjusting bolts 524 which are threaded into adjusting bolt bracket 522 which is attached to support rail 480B. Adjusting bolts 524 abut the edge of mounting plate 518 to assist the horizontal positioning of mounting plate 518. Mounting plate can be secured in position by bolts 520 which are threadably attached to support rail 480B. The tension placed on continuous chain 530 may be adjusted by varying the position of motor mounting plate 512. Chain drive 530 is disposed within chain drive channel 534 provided on support rail 480B. Chain drive channel 534 is provided with a liner 532 to smooth the travel of chain drive 530. It will be appreciated that while the above-described structure facilitates the efficient laying of conduit, structures other than those herein described may also be used.

Additionally, the pressure exerted by continuous chain drive fingers 536A or 536B provide that the lengths of conduit will be maintained in sealing engagement while the conduit is moved out the trailing end of the boxlike structure 366. Once the second length of conduit has been moved off of the first pair of conduit support rails 480A and 480B onto the second pair of conduit support rails 482A and 482B, the chain drive finger, 536A or 536B, slips off the end of the second length of conduit as the chain drive travels around the sprocket located at the trailing end of the conduit support rail 480B. Fingers 536A and 536B are attached to just one chain link, only one attachment is indicated at 538, so as to facilitate the smooth motion of continuous chain 530 around sprockets 528A and 528B.

After the boxlike structure has been advanced in the trench to the point where the second length of conduit has just been removed from the first pair of conduit support rails 480 and backhoe operator no longer draws the boxlike structure through the trench, but proceeds to have another length of conduit 125 lowered into the conduit laying chamber 322. The next length of conduit (not shown) may be lowered into conduit laying chamber 322 in a nearly vertical orientation with the lowermost end of the next length of conduit being placed in position to contact the bell end 125A of the conduit resting on the first pair of conduit support rails 480 and the bell end of the next length of conduit leaning against the vertical conduit guiding ramp 416. Thus, when the boxlike structure is again moved through the trench, the next length of conduit is slowly moved from a vertical orientation to a horizontal orientation onto the first pair of conduit support rails 480. In this manner, the lengths of conduit may be set without the need for a workman to be stationed within the conduit laying compartment. By repeating the above listed steps, a very efficient conduit laying operation may be carried out.

As explained in connection with the previously described embodiments, the boxlike structure 300 may be separated into an upper portion 302 and a lower portion 304 when an underground obstacle, primarily utility lines, is encountered. When such an obstacle is encountered, the upper portion is released from the lower portion by disengaging the latches 402 from the brackets 404 shown in FIG. 14. Also, fill material chute gate 370 is closed by means of the hydraulic ram 376. Thus, when the upper portion is lifted off from the lower portion using cables attached to lifting ears 324, in a manner similar to that shown in FIG. 4, a minimum amount of fill material is spilled into the trench. Furthermore, the present embodiment may be used to lay flexible conduit by incorporating structures similar to those previously described.

Also, when the upper portion is removed from the lower portion, structures may be provided (but are not shown in the figures) to allow the laser receiver mast 328 to be mounted to the mast push rod 452, shown in FIG. 15, at the proper height. In this way, the laser receiver system may be used to maintain the bottom of the trench on-grade up until the time that laser mast 328 must be removed in order to clear an underground obstacle. Furthermore, similar to the previously described embodiments, the embodiment illustrated in FIG. 14 is provided with transverse rods 394 to provide support for the side walls 303 of the boxlike structure. Also, the upper portion is always placed in proper alignment with the lower portion because of nesting protrusions 400 are received by nesting cups 398 in a nesting engagement.

As can be seen from the cross-sectional view of FIG. 14, fill material chute 368 discharges fill material at the trailing end 366 of the boxlike structure. The floor 345 of the boxlike structure, and the second pair of pipe support rails 482A and 482B, terminate prior to the place where fill material chute 308 discharges its contents. As the conduit 125 is pushed out the trailing end of the boxlike structure a volume of fill material envelops the conduit 125, both under and around the conduit. This occurs because the end of the conduit which has left the boxlike structure is supported on one end off the bottom of the trench by support rails 482A and 482B and thus there is a gap between the bottom of the trench and the lower portion of the circumference of the conduit. Thus, as fill material is discharged onto the top of the circumference of the conduit, it falls to the bottom of the trench under the conduit and also encompasses the conduit. Once a particular portion of conduit has been enveloped with fill material in this manner, the flow of fill material is self terminating since the fill material placed around the conduit "plugs" the fill material chute. However, as the boxlike structure is drawn into the newly excavated trench, more fill material is discharged from the fill chute to continue the process.

Thus, using the embodiments described in FIGS. 1–18, a subterranean conduit laying operation may be carried on much more efficiently than with any system hitherto known in the prior art. Particularly, the automatic grade adjustment system provided in the embodiment shown in FIG. 13–14 provides a particularly accurate and efficient conduit laying system.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed and desired to be secured by U.S. Letters Patent is:

1. An apparatus for laying conduit within a trench comprising:
   a boxlike structure having end walls and side walls;
   a conduit laying compartment disposed within said boxlike structure, said conduit laying compartment comprising means for receiving said conduit and means for lowering said conduit to the bottom of said boxlike structure, and for discharging said conduit onto the bottom of said trench;
   drawing means connected to the leading end of said boxlike structure for grasping and advancing said boxlike structure along the bottom of the trench;
   grade detection means for detecting when the bottom of the trench is at the desired grade and for generating a signal indicating when the bottom of the trench is offgrade; and
   adjustable blade means, positioned at a leading end of said boxlike structure, for grading and maintaining the bottom of the trench at a desired grade as said boxlike structure is drawn through the trench, said blade means comprising positioning means, connected to said grade detection means, for automatically adjusting said blade means in response to the signal generated by said grade detection means such that when the bottom of the trench is detected as being off-grade said positioning means will automatically reposition said adjustable blade means independent of said drawing means so as to achieve the desired grade as said boxlike structure is moved through the trench.

2. An apparatus as set forth in claim 1 wherein said boxlike structure comprises separable upper and lower portions and securing means for securing said upper portion of said boxlike structure to the lower portion, said securing means comprising means for selective disengagement such that said upper portion may be disengaged and removed from said lower portion when a pipe or other obstruction is encountered in said trench through which said boxlike structure is being pulled, whereby the lower portion of said boxlike structure can be pulled under said obstruction by removing said upper portion.

3. An apparatus as set forth in claim 2 wherein said drawing means comprises a tow bar rigidly mounted on the leading end of the lower portion of said boxlike structure, said tow bar being supported by brackets so as to receive in grasping engagement the teeth of a bucket of an operator-controlled back hoe.

4. An apparatus as set forth in claim 2 wherein said drawing means comprises a wire rope loop mounted on the leading end of the lower portion of said boxlike structure.

5. An apparatus as set forth in claim 2 wherein said securing means further comprises alignment means for aligning the upper portion of said boxlike structure to the lower portion so that the upper portion rests squarely on the lower portion.

6. An apparatus as set forth in claim 2 wherein said securing means comprises a plurality of engagement members extending below the lower edge of the upper portion of said boxlike structure, and a plurality of corresponding receiving members disposed on the lower portion of the boxlike structure for receiving in nesting engagement said engagement members.

7. An apparatus as set forth in claim 6 wherein each of said engagement members comprises a transverse rod extending between the side walls of said boxlike structure thereby providing support for the side walls.

8. An apparatus as set forth in claim 7 wherein each of said engagement members further comprise U-shaped brackets disposed at each end of said transverse rod and connected to the upper portion of said boxlike structure, and said receiving members comprise U-shaped cups for receiving in nesting engagement said U-shaped brackets.

9. An apparatus as set forth in claim 2 wherein said means for selective disengagement comprises a latch assembly for releasably coupling said upper and lower portions of said boxlike structure together.

10. An apparatus as set forth in claim 2 wherein said boxlike structure further comprises a bin formed therein for receiving and holding fill material.

11. An apparatus as set forth in claim 10 further comprising a chute leading from said bin to the trailing end of the lower portion of said boxlike structure, said chute conveying said fill material from said bin to the bottom of the trench so as to automatically encompass said conduit with fill material as it is laid.

12. An apparatus as set forth in claim 10 further comprising a gate disposed within said upper portion of said boxlike structure and means for shutting said gate so as to close said bin when the upper portion of said boxlike structure is removed from the lower portion, thereby preventing spillage of said fill material.

13. An apparatus as set forth in claim 1 wherein said adjustable blade means comprises an adjustable shearing blade and wherein the apparatus further comprises means for restricting the movement of said adjustable shearing blade to a substantially vertical plane.

14. An apparatus as set forth in claim 1 wherein said grade detection means comprises:
   a laser transmitter disposed to provide a laser signal at a predetermined level above the desired grade; and
   a laser receiver mounted on said boxlike structure for sensing the laser signal from the laser transmitter and for determining whether the depth of the trench is above or below the desired grade.

15. An apparatus as set forth in claim 14 wherein said laser transmitter comprises means for providing an alignment beam and said boxlike structure further comprises a target mounted thereon which provides a visual display of the alignment beam whereby the operator of the apparatus can visually determine if the conduit being laid is in alignment and on-grade.

16. An apparatus as set forth in claim 1 further comprising a dewatering system disposed within said boxlike structure, said dewatering system comprising suction means for discharging water that collects in said boxlike structure from said trench through an exhaust conduit to a location outside of said trench.

17. An apparatus as set forth in claim 1 wherein said boxlike structure has longitudinal bracing members on the side walls for improving the rigidity of the boxlike structure.

18. An apparatus as set forth in claim 1 further comprising a vertical tilt indicator means for displaying whether said boxlike structure is vertically off-center.

19. An apparatus as set forth in claim 1 further comprising a conduit setting means positioned within said conduit laying compartment and comprising means for engaging individual lengths of conduit to each other and for placing said conduit on-grade within the trench.

20. An apparatus as set forth in claim 19 wherein said conduit setting means comprises:
   a first conduit support means for substantially horizontally supporting a first length of conduit;
   a second conduit support means for substantially horizontally supporting a second length of conduit; and
   ram means for effecting engagement between said first and second lengths of conduit.

21. An apparatus as set forth in claim 20 wherein said conduit setting means further comprises ramp means for guiding each said length of conduit, in turn, from an upper opening formed in said conduit laying compartment to a lower portion of said conduit laying compartment.

22. An apparatus as set forth in claim 20 wherein said first and said second conduit support means are independently adjustable such that the first length of conduit may be supported at a height which is different than the height at which the second length of conduit is supported.

23. An apparatus as set forth in claim 22 wherein said first conduit support means is positioned at a height which allows an end of the second length of conduit to receive an adjacent end of the first length of conduit in axial alignment.

24. An apparatus as set forth in claim 20 wherein said conduit setting means further comprises a continuous chain drive which holds said first and said second lengths of conduit in engagement with each other while said continuous chain drive moves said lengths of conduit through a rear opening in said boxlike structure as said boxlike structure is pulled forward.

25. An apparatus as set forth in claim 24 wherein said conduit setting means further comprises a first sensor to detect when said first length of conduit is substantially horizontal and supported by said first conduit support means along its length.

26. An apparatus for laying conduit within a trench comprising:
   a boxlike structure having end walls, side walls, and a leading end;
   drawing means connected to the leading end of said boxlike structure for grasping by an excavating implement and facilitating the advancing of said boxlike structure along the bottom of the trench;
   grade detection means for detecting when the bottom of the trench is at the desired grade and for generating a signal indicating when the bottom of the trench is off-grade; and
   an adjustable shearing blade positioned at the leading end of said boxlike structure, and comprising positioning means for automatically responding to the signal generated by said grade detection means and for vertically adjusting the position of said shearing blade independent of said drawing means such that when the bottom of the trench is detected as being off-grade, said positioning means automatically repositions said shearing blade so as to adjust the level at which the bottom of the trench is sheared to be on-grade.

27. An apparatus as set forth in claim 26 wherein said boxlike structure further comprises a conduit laying compartment comprising means for receiving said conduit and means for placing said conduit at the bottom of the trench.

28. An apparatus as set forth in claim 26 wherein said boxlike structure comprises separable upper and lower portions and securing means for securing said upper portion of said boxlike structure to the lower portion, said securing means comprising means for selective disengagement such that said upper portion may be disengaged and removed from said lower portion when a pipe or other obstruction is encountered in said trench through which said boxlike structure is being pulled, whereby the lower portion of said boxlike structure can be pulled under said obstruction by removing said upper portion.

29. An apparatus as set forth in claim 26 wherein said grade detection means comprises:
   a laser transmitter disposed to provide a laser signal at a predetermined level above the desired grade; and
   a laser receiver mounted on said boxlike structure for sensing the laser signal from the laser transmitter and for determining whether the depth of the trench is above or below the desired grade.

30. An apparatus as set forth in claim 26 wherein said boxlike structure further comprises a bin formed therein for receiving and holding fill material.

31. An apparatus as set forth in claim 30 further comprising a chute leading from said bin to the trailing end of said boxlike structure, said chute conveying said fill material from said bin to the bottom of the trench so as to automatically envelope said conduit with fill material as it is laid.

32. An apparatus as set forth in claim 26 further comprising a conduit setting means positioned within said conduit laying compartment and comprising means for engaging individual lengths of conduit to each other and for placing said conduit on-grade within the trench.

33. An apparatus as set forth in claim 32 wherein said conduit setting means comprises:
   a first conduit support means for substantially horizontally supporting a first length of conduit;
   a second conduit support means for substantially horizontally supporting a second length of conduit; and
   ram means for effecting engagement between said first and said second lengths of conduit.

34. An apparatus for laying conduit within a trench, comprising:
   a boxlike structure having end walls and side walls;
   a conduit laying compartment disposed within said boxlike structure;
   conduit setting means, positioned within said conduit laying compartment, for receiving lengths of conduit placed in said conduit laying compartment and for automatically engaging individual lengths of conduit to each other and discharging said lengths of conduit into the trench, said conduit setting means comprising first and second conduit support means for supporting first and second lengths of conduit in a substantially horizontal, axially aligned position, conduit/ram means for effecting engagement between said lengths of conduit at adjacent ends thereof and a drive means for holding said first and second lengths of conduit in engagement with each other at said adjacent ends while said drive means moves said lengths of conduit through said boxlike structure to discharge said lengths of conduit into said trench; and;

drawing means connected to the leading edge of said boxlike structure for grasping and advancing said boxlike structure along the bottom of the trench.

35. An apparatus as set forth in claim 34 wherein said conduit setting means further comprises ramp means for guiding said conduit into said boxlike structure from an upper opening in said conduit laying compartment to the bottom of said conduit laying compartment.

36. An apparatus as set forth in claim 35 wherein said first and said second conduit support means are independently adjustable such that the first length of conduit may be supported at a height which is different than the height at which the second length of conduit is supported.

37. An apparatus as set forth in claim 35 wherein said first conduit support means is positioned at a height which allows an end of the second length of conduit to receive an adjacent end of the first length of conduit in axial alignment.

38. An apparatus as set forth in claim 34 wherein said conduit ram means comprises a hydraulic cylinder, said hydraulic cylinder acting to move said first length of conduit in the direction of the trailing end of said boxlike structure such that said first length of conduit engages said second length of conduit.

39. An apparatus as set forth in claim 34 wherein said continuous chain drive is driven by a hydraulic motor.

40. An apparatus as set forth in claim 34 wherein said conduit means further comprises a first sensor to detect when said first length of conduit is substantially horizontal and supported by said first conduit support means.

41. An apparatus as set forth in claim 34 further comprising a dewatering system disposed within said boxlike structure, said dewatering system comprising suction means for discharging water that collects in said boxlike structure from said trench through an exhaust conduit to a location outside of said trench.

42. An apparatus as set forth in claim 34 wherein said boxlike structure has longitudinal bracing members on the side walls for improving the rigidity of the boxlike structure.

43. An apparatus as set forth in claim 34 wherein said boxlike structure has steps attached to one of the side walls and descending into said conduit laying compartment for providing manual access to the bottom of the conduit laying compartment.

44. An apparatus as set forth in claim 34 further comprising a tilt indicator for displaying whether said boxlike structure is tilting from vertical, said tilt indicator comprising a pendulum arm suspended from a pivot point on a vertical wall of said boxlike structure.

45. An apparatus as set forth in claim 34 further comprising an adjustable blade means, positioned at a leading end of said boxlike structure, and wherein said adjustable blade means comprises:

an adjustable shearing blade located at a leading end of said boxlike structure, said adjustable shearing blade comprising means for vertical adjustment so as to adjust the level at which the earth at the bottom of the trench will be sheared off;

grade detection means for detecting when the bottom of the trench is on-grade and for indicating when the bottom of the trench is off-grade;

positioning means, connected to both said grade detection means and said adjustable shearing blade, for responding to said grade detection means such that as the bottom of the trench begins to deviate off-grade said positioning means vertically repositions said shearing blade to bring the bottom of the trench back on-grade as the boxlike structure is drawn through the trench.

46. An apparatus as set forth in claim 45 wherein said grade detection means comprises:

a laser transmitter disposed to provide a laser signal at a predetermined level above the desired grade; and a laser receiver mounted on said boxlike structure for sensing the laser signal from the laser transmitter and determining if the depth of the trench is above or below the desired grade.

47. An apparatus as set forth in claim 46 wherein said laser transmitter also provides an alignment beam and said boxlike structure further has a target mounted thereon which provides a visual display of the alignment beam whereby the operator of the apparatus can visually determine if the conduit being laid is in alignment and on-grade.

48. An apparatus as set forth in claim 34 wherein said boxlike structure comprises separable upper and lower portions and securing means for securing said upper portion of said boxlike structure to the lower portion, said securing means comprising means for selective engagement and disengagement such that said upper portion may be disengaged and removed from said lower portion when a pipe or other obstruction is encountered in the trench through which said boxlike structure is being pulled, whereby the lower portion of said boxlike structure can be pulled under said obstruction by removing the upper section.

49. An apparatus as set forth in claim 48 wherein said drawing means comprises a tow bar disposed in brackets rigidly mounted on the leading end of the lower portion of said boxlike structure, said tow bar being disposed so as to be capable of receiving in grasping engagement the teeth of a bucket of an operator-controlled excavating implement.

50. An apparatus as set forth in claim 48 wherein said drawing means comprises a wire rope loop mounted on the leading end of the lower portion of said boxlike structure.

51. An apparatus as set forth in claim 48 wherein said securing means further comprises alignment means for aligning the upper portion of said boxlike structure to the lower portion so that the upper portion rests squarely on the lower portion.

52. An apparatus as set forth in claim 48 wherein said securing means further comprises a plurality of engagement members extending below the lower edge of the upper portion of said boxlike structure, and a plurality of corresponding receiving members disposed on the lower portion of the boxlike structure for receiving in nesting engagement said engagement members.

53. An apparatus as set forth in claim 52 wherein each of said engagement members comprises a transverse rod extending between the side walls of said boxlike structure thereby providing support for the side walls.

54. An apparatus as set forth in claim 52 wherein each of said engagement members further comprises U-shaped brackets disposed at each end of said transverse rod and connected to the upper portion of said boxlike structure, and said receiving members comprise U-shaped cups for receiving in nesting engagement said U-shaped brackets.

55. An apparatus as set forth in claim 48 further comprising fill material bin means disposed within said boxlike structure for holding fill material and for dispensing said fill material around said conduit as said conduit is discharged into said trench.

56. An apparatus as set forth in claim 55 further comprising a fill material chute leading from said fill material bin means to the training end of the lower portion of said boxlike structure, said fill material chute conveying fill material from said fill bin means to the bottom of the trench.

57. An apparatus as set forth in claim 56 further comprising a shut-off gate disposed within the upper portion of said boxlike structure and comprising means for extending said gate into said fill bin means to block the delivery of fill material into the lower portion of the boxlike structure, thereby preventing spillage of fill material when the upper portion of said boxlike structure is removed from the lower portion.

58. An apparatus for laying conduit within a trench, comprising:
   a boxlike structure adapted to be placed into a trench, said boxlike structure having end walls and side walls, said boxlike structure further being separable into an upper portion and a lower portion;
   securing means for securing said upper portion of said boxlike structure to said lower portion, said securing means being capable of selective engagement and disengagement, said upper portion being removable from said lower portion when said securing means is disengaged;
   a conduit laying compartment disposed within said boxlike structure, said conduit laying compartment comprising means for receiving said conduit from an opening in the upper portion of said boxlike structure and providing for passage of said conduit through an opening in the trailing end of said lower portion of said boxlike structure thus allowing said conduit to be laid on-grade at the bottom of the trench;
   conduit setting means for automatically setting said conduit, said conduit setting means being located within said conduit laying compartment and comprising:
   conduit support means for aligning individual lengths of conduit for axial engagement;
   conduit ram means for placing adjacent ends of individual lengths of conduit in engagement; and
   conduit drive means for moving said conduit from off said conduit support means and out the trailing end of said boxlike structure while maintaining said engagement between said individual lengths of conduit;
   drawing means connected to the leading end of said lower portion of said boxlike structure for grasping and advancing said boxlike structure along the bottom of the trench; and
   on-grade adjustment means for automatically shearing the bottom of the trench on-grade as said boxlike structure is drawn through the trench whereby said conduit is laid on-grade as it passes out the trailing end of said boxlike structure onto the bottom of the trench, said on-grade adjustment means comprising:
   an adjustable shearing blade mounted on the leading end of said lower portion of said boxlike structure;
   an on-grade detection means, said on-grade detection means generating a signal indicating the direction the bottom of the trench is off-grade; and
   shearing blade positioning means, responsive to said signal, for vertically adjusting said shearing blade independent of said drawing means so as to maintain the bottom of the trench on-grade.

59. A method of using a conduit laying apparatus for laying conduit on-grade in a trench, said conduit laying apparatus having a boxlike structure which defines a conduit laying compartment, said boxlike structure having a drawing means connected to the leading end thereof and an adjustable shearing blade on the leading end of said boxlike structure, and wherein said method comprises the steps of:
   excavating an initial length of trench of sufficient depth so as to be on-grade and of sufficient length to permit placement of the boxlike structure therein;
   placing the boxlike structure within the initial length of trench and setting the boxlike structure on-grade;
   excavating forward of the boxlike structure to permit advancement of the boxlike structure;
   drawing the boxlike structure forward into the excavated trench by pulling on said drawing means;
   maintaining the bottom of the trench on-grade by automatically adjusting the position of said shearing blade, independent of said drawing means, in response to a laser-generated signal as said boxlike structure is drawn through said excavated trench.

60. A method as set forth in claim 59 further comprising the steps of:
   placing first and second lengths of conduit in said conduit laying compartment; and
   engaging said lengths of conduit as they move through said conduit laying compartment and are laid on-grade in said trench.

61. A method as set forth in claim 60 wherein the step of engaging the said lengths of conduit comprises the steps of:
   supporting said first length of conduit at a height so that said second length of conduit is in axial alignment with said first conduit as it is laid on-grade;
   pushing said second length of conduit into engagement with said first length of conduit; and
   exerting pressure on said second length of conduit so as to move said lengths of conduit out of said conduit laying compartment while maintaining engagement between said lengths of conduit.

62. A method as set forth in claim 59 wherein the step of maintaining the bottom of the trench on-grade further comprises the steps of:
   transmitting a laser beam above ground at a predetermined distance above the proper grade;
   receiving said laser beam by a laser receiver connected to said vertically adjustable shearing blade;
   generating a signal, said signal indicating if the bottom of the trench is deviating off-grade; and
   adjusting the position of said shearing blade in response to said signal so as to maintain the bottom of the trench on-grade.

* * * * *